(12) United States Patent
Goldberg et al.

(10) Patent No.: US 8,131,656 B2
(45) Date of Patent: Mar. 6, 2012

(54) ADAPTIVE OPTIMIZATION METHODS

(75) Inventors: David E. Goldberg, Champaign, IL (US); Kumara Sastry, Champaign, IL (US); Fenando G. Lobo, Aljezur (PT); Claudio F. Lima, Tavira (PT)

(73) Assignee: The Board of Trustees of the University of Illinois, Urbana, IL (US)

( * ) Notice: Subject to any disclaimer, the term of this patent is extended or adjusted under 35 U.S.C. 154(b) by 216 days.

(21) Appl. No.: 11/701,066

(22) Filed: Jan. 31, 2007

(65) Prior Publication Data

US 2007/0208677 A1 Sep. 6, 2007

Related U.S. Application Data

(60) Provisional application No. 60/763,801, filed on Jan. 31, 2006.

(51) Int. Cl.
*G06F 15/18* (2006.01)
(52) U.S. Cl. .......................... 706/13; 706/14
(58) Field of Classification Search .................... 706/13
See application file for complete search history.

(56) References Cited

U.S. PATENT DOCUMENTS

| | | | |
|---|---|---|---|
| 6,006,213 A | 12/1999 | Yoshida | |
| 6,336,109 B2 | 1/2002 | Howard | |
| 6,879,860 B2 | 4/2005 | Wakefield et al. | |
| 6,892,191 B1 | 5/2005 | Schaffer | |
| 6,892,192 B1 | 5/2005 | Geddes et al. | |
| 7,043,462 B2 * | 5/2006 | Jin et al. ........................ | 706/13 |
| 7,043,463 B2 | 5/2006 | Bonabeau et al. | |
| 7,047,169 B2 | 5/2006 | Pelikan et al. | |
| 7,136,710 B1 | 11/2006 | Hoffberg et al. | |
| 7,243,056 B2 * | 7/2007 | Olhofer et al. ..................... | 703/7 |
| 7,280,986 B2 | 10/2007 | Goldberg et al. | |
| 7,324,979 B2 * | 1/2008 | Butler et al. ..................... | 706/25 |
| 7,328,194 B2 * | 2/2008 | Dimitriou et al. ............. | 706/13 |
| 7,328,195 B2 | 2/2008 | Willis | |
| 7,356,518 B2 | 4/2008 | Bonabeau et al. | |
| 7,363,280 B2 * | 4/2008 | Jin et al. ........................ | 706/13 |
| 7,363,281 B2 * | 4/2008 | Jin et al. ........................ | 706/13 |
| 7,428,514 B2 * | 9/2008 | Jin et al. ........................ | 706/13 |
| 7,444,309 B2 * | 10/2008 | Branke et al. .................. | 706/13 |
| 7,451,121 B2 * | 11/2008 | Wu et al. ........................ | 706/13 |
| 7,457,786 B2 * | 11/2008 | Aragones et al. ............... | 706/13 |

(Continued)

OTHER PUBLICATIONS

Jin, Y. et al. A framework for evolutionary optimization with approximate fitness functions, IEEE Transactions on Evolutionary Computation, 6(5):481-494, 2002.*

(Continued)

*Primary Examiner* — Donald Sparks
*Assistant Examiner* — David H Kim
(74) *Attorney, Agent, or Firm* — Greer, Burns & Crain Ltd.

(57) ABSTRACT

Methods and systems for optimizing a solution set. A solution set is generated, and solutions in the solution set are evaluated. Desirable solutions from the solution set are selected. A structural model is created using the desirable solutions, and a surrogate fitness model is created based on the structural model and the desirable solutions. A new solution set may be generated and/or evaluated, based on analyzing at least one of the structural model and the surrogate fitness model, and determining a method for generating a new solution set and/or evaluating the new solution set based at least in part on the analyzing.

23 Claims, 11 Drawing Sheets

U.S. PATENT DOCUMENTS

| | | | |
|---|---|---|---|
| 2003/0055614 A1 | 3/2003 | Pelikan et al. | |
| 2003/0220716 A1* | 11/2003 | Mydlowec et al. | 700/268 |
| 2004/0181266 A1 | 9/2004 | Wakefield et al. | |
| 2004/0220839 A1 | 11/2004 | Bonissone et al. | |
| 2004/0254901 A1 | 12/2004 | Bonabeau et al. | |
| 2005/0118557 A1 | 6/2005 | Sumner, II et al. | |
| 2005/0119983 A1 | 6/2005 | Bonabeau et al. | |
| 2005/0177351 A1 | 8/2005 | Goldberg et al. | |
| 2005/0209982 A1* | 9/2005 | Jin et al. | 706/13 |
| 2005/0216879 A1 | 9/2005 | Ruhe | |
| 2005/0256684 A1* | 11/2005 | Jin et al. | 703/2 |
| 2005/0276479 A1 | 12/2005 | Goldberg et al. | |
| 2006/0184916 A1 | 8/2006 | Baum | |
| 2006/0212279 A1 | 9/2006 | Goldberg et al. | |
| 2006/0225003 A1 | 10/2006 | Agogino et al. | |
| 2007/0112698 A1* | 5/2007 | McArdle | 706/13 |
| 2007/0208677 A1 | 9/2007 | Goldberg et al. | |
| 2007/0208996 A1 | 9/2007 | Berkner et al. | |
| 2009/0070280 A1* | 3/2009 | Beygelzimer et al. | 706/13 |

OTHER PUBLICATIONS

Harik G. Linkage learning via probabilistic modeling in the ECGA. IlliGAL Technical Report 99010. Urbana, IL, University of Illinois at Urbana-Champaign. Jan. 1999.*

Sastry, K. et al. Efficiency Enhancement of Genetic Algorithms via Building-Block-Wise Fitness Estimation. Evolutionary Computation, 2004. CEC2004. Congress on vol. 1, Jun. 19-23, 2004 pp. 720-727 vol. 1.*

Pelikan, M. et al. Hierarchical Bayesian optimization algorithm: toward a new generation of evolutionary algorithms. SICE 2003 Annual Conference. vol. 3, Aug. 4-6, 2003 pp. 2738-2743 vol. 3.*

Jin, Y. A comprehensive survey of fitness approximation in evolutionary computation. Soft Computing—A Fusion of Foundations, Methodologies and Applications archive. vol. 9 , Issue 1 (Jan. 2005) pp. 3-12.*

Jin et al. A Framework for Evolutionary Optimization with Approximate Fitness Functions. IEEE Transactions on Evolutionary Computation, vol. 6 No. 5, Oct. 2002.*

Albert & Goldberg, "Efficient Evaluation Relaxation Under Integrated Fitness Functions." Intelligent Engineering Systems Through Artificial Neural Networks, 11, pp. 165-170, 2001. (Also IlliGAL Report No. 2001024).

Albert & Goldberg, "Efficient Discretization Scheduling in Multiple Dimensions." Proceedings of the Genetic and Evolutionary Computation Conference, pp. 271-278, 2002. (Also IlliGAL Report No. 2002006).

Alias & Llora, "Evolutionary Weight Tuning Based on Diphone Pairs for Unit Selection Speech Synthesis." In EuroSpeech, 2, pp. 1333-1336, Geneve, Switzerland (2003).

Alias, Llora, Idiondo, Sevillano, Formiga & Socoro, "Perception-Guided and Phonetic Clustering Weight Tuning Based on Diphone Pairs for Unit Selection TTS." In Proceedings of the $8^{th}$ International Conference on Spoken Language Processing (ICSLP), pp. 1333-1336. Jeju Island, Korea, 2004.

Armstrong & Jacobson, "Data Independent Neighborhood Functions and Strict Local Optima." Discrete Applied Mathematics, 146(3), pp. 233-243, 2005.

Back, T., "Selective Pressure in Evolutionary Algorithms: A Characterization of Selection Mechanisms." Proceedings of the First IEEE Conference on Evolutionary Computation, pp. 57-62, 1994.

Baluja, S. (1994). "Population-based incremental learning: A method of integrating genetic search based function optimization and competitive learning." (Technical Report CMU-CS-94-163). Carnegie Mellon University.

Barbulescu, Watson, Whitley, Howe, "Scheduling Space-Ground Communications for the Air Force Satellite Control Network." Journal of Scheduling, 7(1), pp. 7-34, 2004.

Barnes, Dimova, Dokov, "The Theory of Elementary Landscapes." Applied Mathematical Letters, 16, pp. 337-343, 2003.

Bartelemy & Haftka, "Approximation Concepts for Optimum Structural Design—A Review." Structural Optimization, 5, pp. 129-144, 1993.

Bergener, Bruckhoff & Igel, "Evolutionary Parameter Optimization for Visual Obstacle Detection." Proc. Advanced Concepts for Intelligent Vision Systems, (ACIVS99), pp. 104-109, 1999.

Bertsekas, D., "Incremental Least Squares Methods and the Extended Kalman Filter." SIAM Journal on Optimization, 6(3), pp. 807-822, 1996).

Beyer, H., "Toward a Theory of Evolution Strategies: Self-adaptation." Evolutionary Computation, 3(3), pp. 311-347, 1996.

Biles, J., "Genjam: A Genetic Algorithm for Generating Jazz Solos." Proc. Int. Computer Music Conf., pp. 131-137, 1994.

Black, A., "Perfect Synthesis for All of the People All of the Time." In IEEE TTS Workshop 2002 (keynote). Santa Monica, USA, 2002 (4 pages).

Black & Tokuda, "Blizzard Challenge—2005: Evaluating Corpus-based Speech Synthesis on Common Datasets." In Proceedings of the $9^{th}$ International Conference on Speech Communication and Technology (InterSpeech), pp. 77-80. Lisboa, Portugal, 2005.

Booker, Dennis, Frank, Serafini, Torczon & Trosset, "A Rigorous Framework for Optimization of Expensive Functions by Surrogates." (Technical Report). Hampton, VA: National Aeronautics and Space Administration (NASA). ICASE Report No. 98-47, 1998.

Bull, "On Model-Based Evolutionary Computation." Soft Comp., 3, pp. 76-82, 1999.

Burke & Smith, "A Multi-Stage Approach for the Thermal Generator Maintenance Scheduling Problem." Proc. 1999 Congress Evolutionary Computation, 2, pp. 1085-1092, Piscataway, NJ: IEEE Jul. 1999.

Cantu-Paz & Goldberg, "On the Scalability of Parallel Genetic Algorithms." Evolutionary Computation, 7(4), pp. 429-449, 1999.

Cantu-Paz, "A Summary of Research on Parallel Genetic Algorithms," Tech. Rep. 95007, IlliGAL Rep., 1995.

Carpenter & Barthelemy, "A Comparison of Polynomial Approximations and Artificial Neural Nets as Response Surfaces." Struc. Optimiz., 5, pp. 1166-1174, 1993.

Chen, Goldberg, Ho, Sastry, "Fitness Inheritance in Multiobjective Optimization." Proceedings of the Genetic and Evolutionary Computation Conference, pp. 319-326, 2002. (Also IlliGAL Report No. 2002017).

Chen & Goldberg, "Introducing Start Expression Genes to the Linkage Learning Genetic Algorithm." In Parallel Problem Solving from Nature (PPSN VII), pp. 351-360, 2002, Springer. (IlliGAL Report No. 2002007).

Coello-Coello, C., "An Updated Survey of GA-Based Multi-objective Optimization Techniques." (Technical Report Lania-RD-09-08). Laboratorio Nacional de Informatica Avanzada (LANIA), Xalapa, Veracruz, Mexico, Dec. 1998.

Coello-Coello, C., "An Updated Survey of Evolutionary Multiobjective Optimization Techniques: State of the Art and Future Trends." Proc. 1999 Congress on Evolutionary Computation, pp. 3-13, Piscataway, NJ: IEEE, 1999.

Colletti & Barnes, "Using Group Theory to Construct and Characterize Metaheuristic Search Neighborhoods." In Rego & Alidaee (eds.), Adaptive Memory and Evolution: Tabu Search and Scatter Search, pp. 303-329, Boston, MA: Kluwer Academic Publishers (2004).

Coletti, Barnes, Dokov, "A Note on Characterizing the k-OPT Neighborhood Via Group Theory." Journal of Heuristics, 5, pp. 47-51, 1999.

Cooper & Herskovits, "A Bayesian Method for the Induction of Probabilistic Networks from Data." Machine Learning, 9, pp. 309-347, 1992.

Coorman, Fackrell, Rutten & Van Coile, "Segment Selection in the L&H RealSpeak Laboratory TTS System." In ICSLP, 2, pp. 395-398, Beijing, China, 2000.

Deb, Agrawal, Pratab & Meyarivan, "A Fast Elitist Non-Dominated Sorting Genetic Algorithm for Multi-Objective Optimization: NSGA-II" (KanGAL report 200001). Indian Institute of Technology, 2000.

Dennis & Torczon, "Managing Approximation Models in Optimization." In Alexandrov & Hussaini, (Eds.), Multidisciplinary Design Optimization: State-of-the-Art, pp. 330-347, Philadelphia, PA: SIAM (1997).

Dunham, Fridshal, D., Fridshal, R. & North, "Design by Natural Selection." Synthese, 15, pp. 254-259, 1963.

El-Beltagy, Nair & Keane, "Metamodeling Techniques for Evolutionary Optimization of Expensive Problems: Promises and Limitations." Proc. Genetic and Evolutionary Computation Conf., pp. 196-203, 1999.

Etxeberria & Larranaga, "Global Optimization Using Bayesian Networks." In Rodriguez, et al, (Eds.), Second Symposium on Artificial Intelligence (CIMAF-99), pp. 332-339, Havana, Cuba, 1999.

Goldberg, D., "The Race, the Hurdle, and the Sweet Spot." In Bentley, (Ed.), Evolutionary Design by Computers, pp. 105-118. San Francisco, CA: Morgan Kaufmann, 1999.

Goldberg, D.E., et al., "Discovering deep building blocks for component genetic algorithms using chance discovery via KeyGraphs." In Oshawa, Y., McBurney, P. (Eds.), Chance Discovery (pp. 276-302). Berlin: Springer-Verlag, 2002.

Goldberg, D.E. et al., "DISCUS: Distributed innovation and scalable collaboration in uncertain settings." (IlliGAL Report No. 2003017). Urbana, IL: University of Illinois at Urbana-Champaign, Illinois Genetic Algorithms Laboratory, 2003.

Goldberg & Voessner, "Optimizing Global-local Search Hybrids." Proceedings of the Genetic and Evolutionary Computation Conference, pp. 220-228, 1999. (Also IlliGAL Report No. 99001).

Goldberg, D., "Using Time Efficiently: Genetic-evolutionary Algorithms and the Continuation Problem." Proceedings of the Genetic and Evolutionary Computation Conference, pp. 212-219, 1999. (Also IlliGAL Report No. 99002).

Goldberg, D., "Making Genetic Algorithms Fly: A Lesson from the Wright Brothers." Advanced Technology for Developers, 2, pp. 1-8 (1993).

Goldberg, Deb, Kargupta & Harik, "Rapid, Accurate Optimization of Difficult Problems Using Fast Messy Genetic Algorithms." Proceedings of the Fifth International Conference on Genetic Algorithms, pp. 56-64, 1993.

Goldberg, Korb & Deb, "Messy Genetic Algorithms: Motivation, Analysis, and First Results." Complex Systems, 3(5), pp. 493-530, 1989 (Also TCGA Report No. 89001).

Grierson & Pak, "Optimal Sizing, Geometrical and Topological Design Using a Genetic Algorithm." Struc. Optimiz., 6(3), pp. 151-159, 1993.

Handa, "The Effectiveness of Mutation Operation in the Case of Estimation of Distribution Algorithms." Biosystems 87, pp. 243-251, 2007.

Hansen & Ostermeier, "Completely Derandomized Self-adaptation in Evolution Strategies." Evolutionary Computation, 9(2), pp. 159-195, 2001.

Harik & Goldberg, "Learning Linkage." Foundations of Genetic Algorithms 4, 4, pp. 247-262, 1997. (Also IlliGAL Report No. 96006).

Harik, G., "Linkage Learning Via Probabilistic Modeling in the ECGA." (IlliGAL Report No. 99010), Urbana, IL: Illinois Genetic Algorithms Laboratory, University of Illinois at Urbana-Champaign, 1999.

Harik, Lobo & Goldberg, "The Compact Genetic Algorithm." IEEE Transactions on Evolutionary Computation, 3(4), pp. 287-297, 1999.

Harik, Cantu-Paz, Goldberg & Miller, "The Gambler's Ruin Problem, Genetic Algorithms, and the Sizing of Populations." Evolutionary Computation, 7(3), pp. 231-253, 1999. (Also IlliGAL Report No. 96004).

Harwig & Barnes, "An Adaptive Tabu Search Approach for 2-Dimensional Orthogonal Packing Problems." Military Operations Research (31 pages), 2006.

Heckendorn & Wright, "Efficient Linkage Discovery by Limited Probing." Evolutionary Computation, 12(4), pp. 517-545, 2004.

Heckerman, Geiger & Chickering, "Learning Bayesian Networks: The Combination of Knowledge and Statistical Data." (Technical Report MSR-TR-94-09). Redmond, WA: Microsoft Research, pp. 197-243, 1994.

Henriet, D., "The Copeland Choice Function An Axiomatic Characterization." Social Choice and Welfare (1985) 2 p. 49-63.

Hunt & Black, "Unit Selection in a Concatentative Speech Synthesis System Using a Large Speech Database." In ICASSP, 1, pp. 373-376, Atlanta, USA, 1996.

Jin, Y., "A Framework for Evolutionary Optimization with Approximate Fitness Functions." IEEE Transactions on Evolutionary Computation, 6(5), pp. 481-494, 2002.

Jin, Y., "A Comprehensive Survey of Fitness Approximation in Evolutionary Computation." Soft Computing Journal, 9(1), pp. 3-12, 2005.

Jin, Olhofer & Sendhoff, "Managing Approximate Models in Evolutionary Aerodynamic Design Optimization." Proceedings of the IEEE International Conference on Evolutionary Computation, pp. 523-528, 2000.

Kosorukoff, Alex, "Human Based Genetic Algorithm", Illinois Genetic Algorithims Laboratory p. 3464-3469, SMC, 2001.

Levin, Jonathan et al., "An Introduction to Vote-Counting Schemes", The Journal of Economic Perspectives, vol. 9, No. 1 (Winter, 1995) p. 3-26.

Lima, Sastry, Goldberg, Lobo, "Combining Competent Crossover and Mutation Operators: A Probabilistic Model Building Approach." Proceedings of the 2005 Genetic and Evolutionary Computation Conference, pp. 735-742, 2005. (Also IlliGAL Report No. 2005002).

Lima, Pelikan, Sastry, Butz, Goldberg, Lobo, "Substructural Neighborhoods for Local Search in the Bayesian Optimization Algorithm." Parallel Problem Solving from Nature (PPSN IX), pp. 232-241, 2006. Available: ftp://ftp-illigal.ge.uiuc.edu/pup/paperspIlliGALs/2006021.pdf.

Llora, Sastry, Goldberg, Gupta & Lakshmi, "Combating User Fatigue in iGAs: Partial Ordering, Support Vector Machines and Synthetic Fitness." Proceedings of Genetic and Evolutionary Computation Comference 2005 (GECCO-2005), pp. 1363-1371, 2005. (Also IlliGAL Report No. 2005009).

Llora, Alias, Formiga, Sastry & Goldberg, "Evaluation Consistency in iGAs: User Contradictions as Cycles in Partial-Ordering Graphs." University of Illinois at Urbana-Champaign, Urbana, IL: Illinois Genetic Algorithms Laboratory, 2005. (Also IlliGAL Report No. 2005022).

Llora, X., et al., Enhanced innovation: A fusion of chance discovery and evolutionary computation to foster creative processes and decision making, (IliGAL Report No. 2004012), University of Illinois at Urbana-Champaign, Illinois Genetic Algorithms Laboratory, Urbana, IL, 2004.

MacKay, "Information-based Objective Functions for Active Data Selection." Neural Comput., 4(4), pp. 305-318, 1992.

Masui, T., "Graphic Object Layout with Interactive Genetic Algorithms." Proc IEEE Workshop Visual Languages, pp. 74-80, 1992.

Meron & Hirose, Efficient Weight Training for Selection Based Synthesis. In EuroSpeech, 5, pp. 2319-2322 (1999). Budapest, Hungary.

Merz, P., "Memetic Algorithms for Combinatorial Optimization Problems: Fitness Landscapes and Effective Search Strategies." Doctoral dissertation, University of Siegen, Germany, 2000 (Part 1 of 2—pp. 1-136).

Merz, P., "Memetic Algorithms for Combinatorial Optimization Problems: Fitness Landscapes and Effective Search Strategies." Doctoral dissertation, University of Siegen, Germany, 2000 (Part 2 of 2—pp. 137-207).

Miller, Nicholas R., "Graph-Theoretical Approaches to the Theory of Voting", American Journal of Political Science, vol. 21, No. 4, (Nov. 1977) p. 769-803.

Miller & Goldberg, "Genetic Algorithms, Tournament Selection, and the Effects of Noise." Complex Systems, 9(3), pp. 193-212, 1995. (Also IlliGAL Report No. 95006).

Miller, B., "Noise, Sampling, and Efficient Genetic Algorithms." Doctoral dissertation, University of Illinois at Urbana-Champaign, General Engineering Department, Urbana, IL, May 1997. (Also IlliGAL Report No. 97001).

Moscato, P., "On Evolution, Search, Optimization, Genetic Algorithms and Martial Arts: Towards Memetic Algorithms." (Technical Report C3P 826). Pasadena, CA: Caltech Concurrent Computation Program, California Institute of Technology, 1989.

Moulin, H., "Choosing from a Tournament", Social Choice and Welfare (1986) 3 p. 271-291.

Muhlenbein & Schlierkamp-Voosen, "Predictive Models for the Breeder Genetic Algorithm: I. Continuous Parameter Optimization." Evolutionary Computation, 1(1), pp. 25-49, 1993.

Munetomo & Goldberg, "Linkage Identification by Non-Monotonicity Detection for Overlapping Functions." Evolutionary Computation, 7(4), pp. 377-398, 1999.

Ohsawa, Y., et al., "KeyGraph Automatic indexing by co-occurrence graph based on building construction metaphor", Proceedings of Advances in Digital Libraries, 12-18 (1998).

Ohsawa, Y., et al., "Chance Discovery", Berlin: Springer-Verlag (2003).

Ostermeier, "A Derandomized Approach to Self Adaptation of Evolutionary Strategies." Evolut. Comput., 2(4), pp. 369-380, 1994.

Pelikan, M., "Bayesian Optimization Algorithm: From Single Level to Hierarchy." Doctoral dissertation, University of Illinois at Urbana-Champaign, Urbana, IL, 2002. (Also IlliGAL Report No. 2002023).

Pelikan & Sastry, "Fitness inheritance in the Bayesian Optimization Algorithm." Proceedings of the Genetic and Evolutionary Computation Conference, 2, pp. 48-59, 2004. (Also IlliGAL Report No. 2004009).

Pelikan & Goldberg, "Escaping Hierarchical Traps with Competent Genetic Algorithms." Proceedings of the Genetic and Evolutionary Computation Conference, pp. 511-518, 2001. (Also IlliGAL Report No. 2000020).

Pelikan, M., "Hierarchical Bayesian Optimization Algorithm: Toward a New Generation of Evolutionary Algorithms." Springer, pp. 2738-2743 (2005).

Pelikan, Goldberg & Cantu-Paz, "BOA: The Bayesian Optimization Algorithm." In Banzhaf et al, (Eds.), Proceedings of the Genetic and Evolutionary Computation Conference GECCO-99, pp. 525-532, San Francisco, CA: Morgan Kaufmann (1999). (Also IlliGAL Report No. 99003).

Pelikan, Goldberg, Cantu-Paz, "Bayesian Optimization Algorithm, Population Sizing, and Time to Convergence." In Whitley, Goldberg, Cantu-Paz, Spector, Parmee & Beyer, (Eds.), Proceedings of the Genetic and Evolutionary Computation Conference (GECCO-2000), pp. 275-282, Las Vegas, NV: Morgan Kaufmann (Jul. 10-12, 2000). (Also IlliGAL Report No. 2000001).

Pelikan, Goldberg & Lobo, "A Survey of Optimization by Building and Using Probabilistic Models." Computational Optimization and Applications, 21(1), pp. 5-20, 2002. (Also IlliGAL Report No. 99018).

Plutowski & White, "Selecting Concise Training Sets from Clean Data." IEEE Trans. Neural Networks, 4, pp. 305-318, 1993.

Ratle, "Accelerating the Convergence of Evolutionary Algorithms by Fitness Landscape Approximation." In Parallel Problem Solving from Nature, Eiben, Back, Schoenauer & Schwefel (Eds.), vol. V., pp. 87-96, Berlin, Germany. Springer (1998.

Redmond & Parker, "Actuator Placement Based on Reachable Set Optimization for Expected Disturbance." J. Optimiz. Theory Applic., 90(2), pp. 279-300, Aug. 1996.

Rosenbrock, "An Automatic Method for Finding the Greatest or Least Value of a Function." Comput. J., 3(3), pp. 175-184, 1960.

Sacks, Welch, Michell & Wynn, "Design and Analysis of Computer Experiments." Statist. Sci., 4, pp. 409-435, 1989.

Santarelli, Goldberg & Yu, "Optimization of a Constrained Feed Network for an Antenna Array Using Simple and Competent Genetic Algorithm Techniques." Military and Security Application of Evolutionary Computation (MSAEC-2004), Workshop Proceedings at the Genetic and Evolutionary Computation Conference, 2004 (3 pages).

Santarelli, Yu, Goldberg, Altschuler, O'Donnell & Southall (in press), "Military Antenna Design Using Simple and Competent Genetic Algorithms." Computer and Mathematics with Applications and Mathematical and Computer Modeling (72 pages), 2005.

Sastry, Goldberg & Pelikan, "Efficiency Enhancement of Probabilistic Model Building Genetic Algorithms." Urbana, IL: University of Illinois at Urbana-Champaign, Illinois Genetic Algorithms Laboratory, 2004. (Also IlliGAL Report No. 2004020).

Sastry, K., "Evaluation-Relaxation Schemes for Genetic and Evolutionary Algorithms." Master's thesis, University of Illinois at Urbana-Champaign, General Engineering Department, Urbana, IL, 2001. (Also IlliGAL Report No. 2002004).

Sastry & Goldberg, "Genetic Algorithms, Efficiency Enhancement, and Deciding Well with Fitness Functions with Differing Bias Values." Proceedings of the Genetic and Evolutionary Computation Conference (GECCO-2002), pp. 536-543, 2002. (Also IlliGAL Report No. 2002003).

Sastry, Abbass & Goldberg, "Sub-structural Niching in Non-Stationary Environments." Urbana, IL: Illinois Genetic Algorithms Laboratory, University of Illinois at Urbana-Champaign, 2004. (Also IlliGAL Report No. 2004035).

Sastry, Pelikan, & Goldberg, "Efficiency Enhancement of Genetic Algorithms Via Building-block-wise Fitness Estimation." Proceedings of the IEEE International Conference on Evolutionary Computation, pp. 720-727, 2004. (Also IlliGAL Report No. 2004010).

Sastry, Lima, & Goldberg, "Evaluation Relaxation Using Substructural Information and Linear Estimation." Proceedings of the 2006 Genetic and Evolutionary Computation Conference, pp. 419-426, 2006. (Also IlliGAL Report No. 2006003).

Sastry & Goldberg, "Let's Get Ready to Rumble: Crossover Versus Mutation Head to Head." Proceedings of the Genetic and Evolutionary Computation Conference, 2, pp. 126-137, 2004. (Also IlliGAL Report No. 2004005).

Sastry & Goldberg, "Designing Competent Mutation Operators Via Probabilistic Model Building of Neighborhoods." Proceedings of the Genetic and Evolutionary Computation Conference, 2, pp. 114-125. (Also IlliGAL Report No. 2004006).

Sastry & Goldberg, "Genetic Algorithms, Efficiency Enhancement, and Deciding Well with Differing Fitness Bias Values." Proceedings of the Genetic and Evolutionary Computation Conference, pp. 536-543, 2002a. (Also IlliGAL Report No. 2002003).

Sastry & Goldberg, "Genetic Algorithms, Efficiency Enhancement, and Deciding Well with Differing Fitness Variances." Proceedings of the Genetic and Evolutionary Computation Conference, pp. 528-535, 2002b. (Also IlliGAL Report No. 2002002).

Sastry & Goldberg, "Don't Evaluate, Inherit." Proceedings of the Genetic and Evolutionary Computation Conference. pp. 551-558, 2001. (Also IlliGAL Report No. 2001013).

Sastry, Johnson, Goldberg & Bellon, "Genetic Programming for Multiscale Modeling." International Journal of MultiScale Computational Engineering, 2(2), pp. 239-256, 2004.

Schwarz, G., "Estimating the Dimension of a Model." The Annals of Statistics, 6, pp. 461-464, 1978.

Sebag & Ducoulombier, "Extending Population-Based Incremental Learning to Continuous Search Spaces." Lecture Notes in Computer Science, 1498, pp. 418-427, 1998.

Simpson, Mauery, Korte & Mistree, "Comparison of Response Surface and Kriging Models for Multidisciplinary Design Optimization." AIAA, Tech. Rep., 1998 (11 pages).

Sims, "Artificial Evolution for Computer Graphics." Comput. Graph., 25(4), pp. 319-328, 1991.

Smith, Dike & Stegmann, "Fitness Inheritance in Genetic Algorithms." In Proceedings of the ACM Symposium on Applied Computing, pp. 345-350, 1995. New York, NY, USA: ACM.

Spears, W., "Crossover or Mutation?" In Whitley, (ed.), Foundations of Genetic Algorithms 2, pp. 221-237. San Mateo, CA: Morgan Kaufmann (1993).

Srivastava, R., "Time Continuation in Genetic Algorithms." Masters thesis, University of Illinois at Urbana-Champaign, Urbana, IL, 2002. (Also ILLiGAL Report No. 2002021) Available: ftp://ftp-illigal.ge.uiuc.edu/pub/papers/IlliGALs/2002021.ps.Z.

Stocai, Klimeck, Salazar-Lazaro, Keymeulen & Thakoor, "Evolutionary Design of Electronic Devices and Circuits." Proc. 199 Congress on Evolutionary Computation, pp. 1271-1278, Piscataway, NJ: IEEE, Jul. 1999.

Takagi, H., "Interactive Evolutionary Computation: Fusion of the Capabilities of EC Optimization and Human Evaluation." Proceedings of the IEEE, 89(9), pp. 1275-1296, 2001.

Thierens, D., "Scalability Problems of Simple Genetic Algorithms." Evolutionary Computation, 7(4), 331-352, 1999.

Toda, Kawai & Tsuzaki, "Optimizing Sub-Cost Functions for Segment Selection Based on Perceptual Evaluations in Concatentative Speech Synthesis." In Proceedings of ICASSP, pp. 657-660. Montreal, Canada, 2004.

Vaughan, Jacobson, Armstrong, "A New Neighborhood Function for Discrete Manufacturing Process Design Optimization Using Generalized Hill Climbing Algorithms." ASME Journal of Mechanical Design, 122(2), pp. 164-171, 2000.

Vijayakumar & Ogawa, "Improving Generalization Ability Through Active Learning." IECE Trans. Inform. Syst., E82-D(2), pp. 480-487, 1999.

Watson, J., "Empirical Modeling and Analysis of Local Search Algorithms for the Job-shop Scheduling Problem." Doctoral dissertation, Colorado State University, Fort Collins, CO, 2003 (Part 1 of 2—pp. 1-130).

Watson, J., "Empirical Modeling and Analysis of Local Search Algorithms for the Job-shop Scheduling Problem." Doctoral dissertation, Colorado State University, Fort Collins, CO, 2003 (Part 2 of 2—pp. 131-217).

* cited by examiner (a) Simple fitness inheritance  (b) Substructural fitness inheritance (a) Probability model    (b) Substructural fitness model

ADAPTIVE OPTIMIZATION METHODS

PRIORITY CLAIM AND REFERENCE TO RELATED APPLICATION

This application claims the benefit of U.S. Provisional Application Ser. No. 60/763,801, filed Jan. 31, 2006, under 35 U.S.C. §119.

STATEMENT OF GOVERNMENT INTEREST

This invention was made with Government support under Contract Number F49620-03-1-0129 awarded by Air Force Office of Scientific Research (AFOSR). The Government has certain rights in the invention.

BACKGROUND OF THE INVENTION

This invention relates generally to the field of methods for optimization, and in preferred embodiments relates more particularly to the field of genetic and evolutionary algorithms (GAs). The invention further relates generally to computer programs and computer-aided methods for optimization.

Many real-world problems have enormously large potential solution sets that require optimization. Optimal designs for bridges, potential trajectories of asteroids or missiles, optimal molecular designs for pharmaceuticals, optimal fund distribution in financial instruments, and the like are just some of the almost infinite variety of problems that can provide a large set of potential solutions that need to be optimized.

One type of optimization method is the genetic or evolutionary algorithm (GA). In GAs, individual variables are analogous to "genes", and a particular solution to an optimization problem, including a plurality of variables, is analogous to a "chromosome". The variables may be, for example: bits; discrete, fixed-length representations; vectors; strings of arbitrary length; program codes; etc. Other types of optimization methods include, but are not limited to, evolutionary computing, operations research (OR), global optimization methods, meta-heuristics, artificial intelligence and machine learning techniques, etc., and methods of the present invention may be applicable to one or more of these optimization methods as well.

The goal with GAs is to optimize a solution or at least produce an acceptable solution according to desirable criteria. Generally, GA methods follow a scheme (sometimes referred to as initialization) of taking a set of potential solutions (a solution set or population) from a solution space, evaluating them using some scoring metric (a fitness evaluation), identifying desirable or better solutions from the set using a scheme, and determining if completion criteria are satisfied. If the criteria are satisfied, the optimization ends. If not, a new solution set is generated or evolved, often based on the selected desirable solutions, and the method is repeated. The new solution set may replace some or all of the previous solution set. Alternatively or additionally, a determination of whether completion criteria are satisfied can occur after generation of the new solution set. Iterations (epochs) continue until completion criteria are satisfied. Often, this occurs when generated solutions converge around an optimal or acceptable solution.

Those knowledgeable in the art will appreciate that "fitness" generally refers to how good a candidate solution is with respect to the problem at hand. Fitness may also be thought of as solution quality, and fitness evaluation therefore may be thought of as solution quality assessment, a function evaluation, or an objective value evaluation. Fitness evaluation may be, for example, objective, subjective (e.g., by a human), and/or via a vector of evaluations (e.g., multiobjective optimization).

Crossover and mutation are two known methods for generating or evolving a new solution set from selected desirable solutions in GAs. Generally, in crossover, parts of two or more selected desirable solutions are recombined in some way to generate new solutions. In mutation, on the other hand, one or more variables within a selected desirable solution are altered in some way to generate new solutions.

Through multiple iterations of evaluating individuals within a population for fitness, and through generating new populations based at least partly on "survival of the fittest" for solutions, GAs can be used to provide acceptable or optimal solutions for a variety of problems. However, concerns exist regarding the use of GAs and other optimization methods.

As one example, for complex or large problems, iterations may continue for relatively long periods, and may otherwise consume considerable computational resources. A solution space can reach millions, hundreds of millions, billions, or even tens of digits or more of potential solutions for optimization. For example, when optimizing a problem that has a 30-bit solution, the potential solution space is a billion. Under these circumstances, random searching or enumeration of the entire solution space is not practical.

Another concern is the amount of resources required for the fitness evaluation step. When faced with a large-scale problem, the step of evaluating the fitness or quality of all of the solutions can demand high computer resources and execution times. To improve efficiency, fitness evaluation may be handed off to a computational procedure to determine fitness. However, for large-scale problems, the task of computing even a sub-quadratic number of function evaluations can be daunting. This is especially the case if the fitness evaluation is a complex simulation, model, or computation. The fitness evaluation step often presents a time-limiting "bottleneck" on performance that makes use of some conventional GAs impractical for some applications.

Thus, a number of optimization techniques for GAs have been employed in the art having at least a partial goal of reducing the number of fitness evaluations necessary to achieve convergence. Optimizations have led to so-called "competent" GAs, which are GAs that solve large, hard problems quickly, reliably, and accurately.

One exemplary optimization technique is based on a consideration that certain variables within a solution set may be linked together in some way, and an optimal solution may be found more quickly by employing this consideration during generation of new solution sets. As a nonlimiting example, a combustion engine could be described in very simple terms as elements of one or more combustion chambers, one or more pistons, a transmission, an ignition source, and a fuel supply. Some of these components are linked to others. The pistons, for instance, are linked to the combustion chambers and the drive train, and the fuel supply and ignition source are linked to the combustion chamber.

Very generally, by considering this linkage of variables, a design problem may be decomposed into quasi-separate sub-problems. Each subproblem may be solved using facetwise analysis and little models, providing subsolutions. These sub-solutions may then be integrated using techniques such as dimensional analysis, probabilistic reasoning, or higher order little models.

Linked variables may be thought of as forming "module" or, as referred to herein, "building blocks (BBs)". Understanding that most GAs process building blocks, and using this understanding to solve problems, can aid in design of GAs. In certain embodiments, once identified in some way, such BBs may be manipulated in groups to provide new populations. As one non-limiting example, mutation may be performed as a BB-wise operation, as opposed to a simple bit-wise operation.

Simple selectorecombinative (selection plus recombination) GAs can solve BB-easy problems like the bit-counting problem in subquadratic time over a wide range of parameters (e.g., population size, selection pressure, crossover probability). Viewed in GA parameter space, a simple GA has a large sweet spot, making it easy to set up and solve easy problems. However, as problems get harder, the sweet spot becomes smaller and smaller even if the population size is increased nominally to account for the added difficulty. In fact, it has been shown that to solve harder problems using simple, fixed recombination operators requires population sizes that grow exponentially, even with fixes such as elitism, niching, and mating restriction.

Thus, another type of optimization technique uses problem decomposition to generate new populations, in which the problem decomposition employs operators that are able to capture and adapt to an underlying problem structure. By building a distribution model, and gaining insight into the structure of the problem, particularly the interactions between variables, it becomes easier to determine an optimal or acceptable solution. Such nontraditional GAs can recombine BBs to solve what have been called nearly decomposable problems, quickly, accurately, and reliably. Some solvers do decomposition explicitly, such as by building a model, while others do implicit decomposition, such as by gathering variables that are related to one another. Recombination operators may include, for example, perturbation techniques, linkage adaptation techniques, probabilistic model building techniques, and other techniques. Mutation operators may include, for example, a random walk locally around a solution, evolutionary strategies (ESs), and other operators. Some GAs using problem decomposition techniques can solve decomposable problems within a low-order polynomial number of fitness evaluations.

One of the more promising optimization techniques is the class of methods known as probabilistic model-building genetic algorithms (PMBGAs), also known as estimation distribution algorithms (EDAs). In these methods, an explicit probabilistic model is built from the best solutions, and the model is then used to construct new instances of possibly better strings. PMBGAs preferably maintain linking of variables by considering such linkage in the probabilistic model. Very generally, a typical PMBGA often includes: a scheme to select the better individuals; an assumed probabilistic model or a class of probabilistic models; a class-selection metric; a search mechanism for choosing a particular model from the admissible class; and a scheme to generate new individuals according to the selected model.

As just one of many examples, in the compact genetic algorithm (cGA), a population of bit strings is modeled by a probability vector p[i], where the probability value represents the probability of being a one. Other, nonlimiting examples of PMBGAs include population incremental learning (PBIL) algorithm, univariate marginal distribution algorithm (UMDA), Bivariate Marginal Distribution Algorithm (BMDA), Mutual Information Maximization for Input Clustering (MIMIC), Combining Optimizers with Mutual Information Trees (COMIT), Bayesian optimization algorithm (BOA) (and variants thereof), extended compact genetic algorithm (eCGA), factorized distribution algorithm (FDA), and others.

Combining probabilistic model building techniques with techniques that are able to capture and adapt to an underlying problem structure can often lead to competent GAs. Exemplary competent GAs known in the art include, as non-limiting examples, the Bayesian optimization algorithm (BOA), and the extended compact genetic algorithm (eCGA). GAs that build model structure may be competent GAs, such as, but not limited to, eCGAs and BOA. Those employing a fixed structure, such as cGA, PBIL, and UMDA, generally are not competent GAs. For example, eCGAs and BOAs (or variants thereof) have been quite successful in tackling large difficulty problems with little or no prior problem knowledge across a spectrum of problem areas.

Thus, some problems that were impractical to solve using GAs became tractable by using competent GAs. However, for large-scale problems, even a low-order polynomial number of fitness evaluations can be very demanding on available time and/or computing resources. For example, polynomial convergence in large problems may still leave a solver with a practicality gap between the time available and the time required to obtain sufficiently high quality solutions. Thus, to date, known optimization methods have substantial limitations, and accordingly, GAs and other optimization methods have been limited in their use for solving real-world problems.

SUMMARY OF THE INVENTION

A method for optimizing a solution set is provided according to exemplary embodiments of the present invention. A solution set is generated, and solutions in the solution set are evaluated. Desirable solutions from the solution set are selected. A structural model is created using the desirable solutions, and a surrogate fitness model is created based on the structural model and the desirable solutions.

A new solution set may then be generated, including analyzing at least one of the structural model and the surrogate fitness model, determining a method for generating a new solution set based at least in part on the analyzing, and generating a new solution set based on the determined method. Alternatively or additionally, a new solution set may be evaluated, including analyzing at least one of the structural model and the surrogate fitness model, determining a method for evaluating solutions based at least in part on the analyzing, and evaluating solutions in the new solution set based on the determined method.

DETAILED DESCRIPTION

Figure 1:
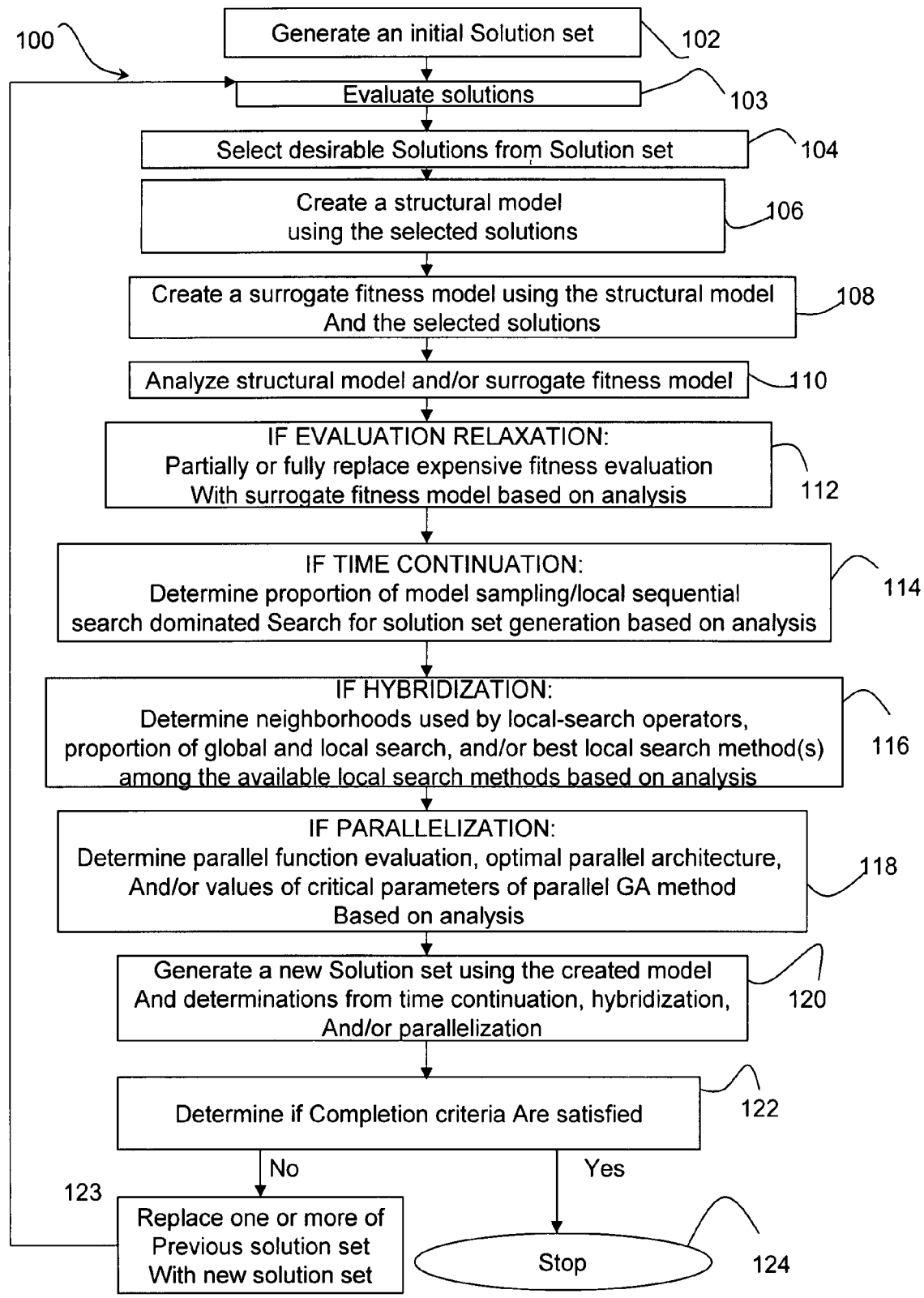
FIG. 1 shows an exemplary optimization method incorporating one or more techniques for efficiency enhancement, according to embodiments of the present invention.

Some embodiments of the present invention are directed to methods and program products for optimizing a solution set for a problem. Those knowledgeable in the art will appreciate that embodiments of the present invention lend themselves well to practice in the form of computer program products. Accordingly, it will be appreciated that embodiments of the invention may comprise computer program products comprising computer-executable instructions stored on a computer-readable medium that when executed cause a computer to undertake certain steps. Other embodiments of the invention include systems for optimizing a solution set, with an example being a processor-based system capable of executing instructions that cause it to carry out a method of the invention. Results of exemplary methods may be displayed on one or more displays and/or stored in a suitable memory. It will accordingly be appreciated that description made herein of a method of the invention may likewise apply to a program product of the invention and/or to a system of the invention.

Competent genetic and evolutionary algorithms, such as but not limited to eCGA and BOA, are able to solve difficult optimization problems requiring only a subquadratic number of fitness evaluations, in contrast to simple GAs that scale exponentially. In this way, problems that were intractable to traditional genetic algorithms became tractable when using competent genetic and evolutionary algorithms.

However, for large-scale problems, even a subquadratic number of fitness evaluations can be a very demanding process. This is especially true if the fitness evaluation requires a complex simulation or computation. Given a sufficiently large population size and run duration, GAs yield satisfactory results for a wide range of problems. However, when resources and time are limited, as is the case with any real-world optimization problem, it is imperative to use available resources judiciously.

This realization has led to the development of efficiency enhancement techniques that allow one to go from tractability to practicality when using genetic and evolutionary algorithms in real-world optimization problems. Embodiments of the present invention provide ways to improve upon even these efficiency enhancement techniques. A brief summary of exemplary efficiency enhancement techniques that may be improved by embodiments of the present invention will now be described.

One type of efficiency enhancement technique is parallelization. Non-limiting examples of parallelization techniques are disclosed in Cantú-Paz, E., Efficient and accurate parallel genetic algorithms, Boston, Mass.: Kluwer Academic Press, 2000. Generally, parallelization increases the amount of hardware used to solve a problem to speed along a solution, such as by providing hardware for parallel computation. However, parallel computation is notoriously susceptible to so-called serial and communications bottlenecks that diminish the efficiency of the added hardware. Fortunately, even the simplest master-slave GAs have been shown to exhibit linear speedups for numbers of processors up to the limit $\sqrt[3]{nT_f/T_C}$, where n is the required population size, $T_f$ is the time per function evaluation, and $T_C$ is the time required for communication between master and slave per evaluation. More careful parallelization can effectively use additional processors, and this idea can be exploited by embodiments of the present invention.

Evaluation relaxation takes an expensive fitness evaluation and tries to "cheapen" it in a variety of ways. In stochastic simulation, for example, fewer samples may be tried. In complex field problems or elsewhere where numerical simulations of differential or integral equations are necessary, techniques of discretization scheduling may be used. It may also be possible to inherit fitness values from previous evaluations in a systematic manner or create explicit fitness surrogates. Examples of evaluation relaxation techniques are known in the art. One of the challenges in evaluation relaxation is to differentiate between bias and variance as sources of error and to use an appropriate strategy (temporal vs. spatial, respectively) for each type.

Another efficiency enhancement technique is hybridization. Hybridization typically involves combining the global-search capabilities of GAs with local-search methods that often include domain- or problem-specific knowledge. For example, local search moves with domain-specific procedures may be performed in place of simple mutation operators. These local searches can be, for example, gradient searches or local methods from operations research (OR). Many applications of GAs in industry follow this approach to gain from the benefits of hybridization. Hybrid GAs are also referred to as memetic algorithms or genetic local search methods. Exemplary techniques of appropriate hybridization are known in the art, and a detailed discussion of such techniques is therefore omitted herein.

Typically, the motivation for incorporating local search methods into GAs comes from the fact that local search helps GAs to achieve a faster convergence and to refine the solutions obtained by the GA (reducing the fitness variance in the population). However, while hybridization is often used in applying GAs to solve real-world problems, the present inventors have recognized that most hybridization methods are ad hoc, and automatic and/or systematic methods are lacking for hybridizing and designing global and local-search methods that automatically identify the problem decomposition and important problem substructures. Further, suitable techniques are lacking for employing hybridization when information about the problem is absent.

Another efficiency enhancement technique, referred to herein as "time continuation", concerns efficient time budgeting. Time continuation deals with the tradeoffs between schemes involving large populations running for a single or small number of generations (epochs) versus smaller populations running through several continuation generations. Thus, time continuation asks about the appropriate temporal sequence of the solution procedure; i.e., is it population oriented, essentially sequential, or a mix? This represents an exploitation-exploration tradeoff by considering when the algorithm should stop working with the current population and attempt to explore new regions of the search space. Examples of time continuation are disclosed in Srivastava, R., Time Continuation in Genetic Algorithms, Masters Thesis, University of Illinois at Urbana-Champaign, Urbana, Ill., 2002, which is incorporated by reference herein.

According to aspects of the present invention, methods are provided for integrating structural and/or fitness surrogate model building into these efficiency enhancement techniques. For example, in time continuation model building may be used to understand the problem structure (substructure) and this knowledge along with information from a surrogate fitness model may then be used to select appropriate population-oriented or sequential operation, depending on the structure uncovered. Knowledge of the substructure and other knowledge obtained through model building can also be used to improve efficiency enhancement techniques such as parallelization, evaluation relaxation, and hybridization.

According to preferred embodiments of the present invention, at least a structural model and a surrogate fitness model are constructed, and one or both of these models are used to evaluate criteria associated with one or more efficiency enhancement techniques including evaluation relaxation, time continuation, hybridization, and parallelization. For example, in some exemplary methods of the present invention, steps of building a model representative of desirable solutions may be performed over multiple iterations. The change in the model between iterations of an evolutionary computation is determined. The rate of change in the model is a useful criterion to adjust method steps. For example, if the model is rapidly changing, this suggests the presence of noise. Because a large population size is useful to mitigate the effects of noise, the population size can be increased in response. Alternatively or additionally, a global search may be performed instead of a local search. If, on the other hand, the rate of change of the model is relatively small, this suggests that the noise level is low. The population size can be decreased and/or a local search method can be used instead of a global search. If the model is undergoing only small changes, but the changes in interaction between variables in each iteration are relatively large, a method may react by using a small population (and/or local search) but to focus on particular variable interactions of interest.

In other embodiments of the present invention, steps in one or more efficiency enhancement techniques depend at least partly on the structural model and/or the surrogate fitness model in a particular generation. As nonlimiting examples, the surrogate fitness model may be to partially or fully replace an expensive fitness evaluation, and the models may be used to determine the use of the expensive fitness model, the surrogate fitness model, or some combination of both. The surrogate fitness model may alternatively or additionally be used to infer problem difficulty facets for making decisions regarding time continuation. The surrogate model may also be used to determine an improved or optimal proportion of global and local search and/or select a local search method. In other exemplary embodiments, the surrogate model may be used to decide architecture, including structure and/or critical parameters, for parallelization techniques.

FIG. 1 is a flowchart illustrating an exemplary embodiment of a method and program product 100 of the invention. A solution set is first initialized (step 102). Initialization may include, for example, creating a solution set including a plurality of members. In some exemplary methods, creating an initial solution set may include defining a solution set through use of one or more rules or algorithms. As a nonlimiting example, initialization may include defining a solution space as including all possible bit strings of length 6 bits, with the result that the initial solution space includes $2^6$ members.

In many real world applications, the size of the overall solution space may number into the millions, billions, or more. In such cases, creating an initial solution set may include, for example, sampling the solution space to select an initial solution set of reasonable size. Sampling may be performed through any of various methods, including but not limited to random sampling, statistical sampling, probabilistic sampling, and the like, and these and other methods are known to those of ordinary skill in the art. Thus, the initial solution set in exemplary embodiments may include a number of solutions that is fewer than the total number of solutions in the solution space.

Different problems and approaches may lead to different population sizes for the initial solution set. By way of example only, in a 10×4 trap function problem, the solution space has a total of $2^{40}$ different potential solutions. When optimizing such a solution through an exemplary method of the invention, an initial solution set may be created of a population size of about 1600 through random or other sampling of the solution space.

It will be appreciated that the individual members of the solution set may be potential solutions to any of a wide variety of real world problems. For example, if the problem at hand is the optimal design of a large electrical circuit, the solutions may be particular sequences and arrangements of components in the circuit. If the problem at hand is optimal distribution of financial funds, the solutions may be different distribution percentages between different investments. If the problem at hand is the optimal design of a bridge, the solutions may specify a material of construction, dimensions, support placement, and the like. If the problem at hand is the optimal process for making a pharmaceutical, the solutions may be different sequences of chemical reaction, different temperatures and pressures, and different reactant compounds.

Referring again to FIG. 1, a number of desirable solutions are selected from the solution set. Preferably, this is done by evaluating the fitness of all of the solutions in the solution set (step 103), and selecting the desirable solutions based on the evaluated fitness (step 104). Those knowledgeable in the art will appreciate that "fitness" generally refers to how good a candidate solution is with respect to the problem at hand. Fitness may also be thought of as solution quality, and fitness evaluation therefore thought of as solution quality assessment or an objective value evaluation.

Fitness may be evaluated using a fitness function, which may be, for example, a fitness calculator that calculates fitness based on particulars of the problem to be solved. The fitness calculator may comprise, for example, a relatively complex calculation or series of calculations. If the problem at hand is the optimal design of a bridge, for instance, the fitness calculator may solve a series of integrations, differential equations and other calculations to determine a resultant bridge weight, location of stress points, and maximum deflection based on an input solution string. Use of the fitness calculator may therefore require substantial computational resources and time. This is particularly the case when a large number of solutions must be evaluated.

Alternatively or additionally, a fitness estimation may be used to estimate fitness for one or more of the solutions in the solution set. The fitness estimation, for example, may use a surrogate fitness model to estimate fitness. A surrogate fitness model, for example, can be a relatively simple model of fitness when compared to the fitness calculator. In many real world problems, use of fitness estimation therefore can offer substantial computational resource and time savings, particularly when faced with large solution sets to be evaluated.

Fitness estimation, though it may include some amount of calculation, is computationally less expensive (i.e., requires less processing power) and requires less execution time than fitness calculation, but also provides less precision. Thus, a fitness calculation is also referred to as an "expensive fitness evaluation" herein.

Some balance preferably should be achieved between accuracy of fitness determination and computation resources consumed. Thus, decision criteria may be used to determine whether fitness estimation, fitness calculation, or a proportion of each will be used to determine fitness. Examples of these decision criteria may be found, for example, in co-pending U.S. patent application Ser. No. 11/343,195, filed Jan. 30, 2006, entitled "METHODS FOR EFFICIENT SOLUTION SET OPTIMIZATION", which is incorporated herein by reference. Additional discussion of decision criteria is also provided below.

One or both of fitness calculation and fitness estimation are used to evaluate (step 103) the fitness of solutions from the solution set based on the decision criteria. Fitness calculation or estimation can result in a scalar number, a vector, or other value or set of values.

Desirable solutions are then selected (step 104). Selection may include, for example, selecting a high scoring portion of the evaluated solutions. Selection may require some scoring metric to be provided that defines which evaluations are preferred over others. For example, if fitness evaluation simply results in a single numerical fitness value, one simple scoring metric can be that a high fitness value is preferred over a low value. More complex scoring metrics can also apply. Referring once again to the bridge design hypothetical solutions, a scoring metric may be some combination of a minimized total bridge weight, stress points located close to the ends of the bridge, and a minimized total deflection.

At least two models, a structural model (step 106) and a fitness surrogate model (step 108), are then built based at least on the selected solutions. The structural model (step 106) should be representative, in some manner, of the desirable solutions. The structural model also preferably provides some knowledge, either implicit or explicit, of a relationship between variables. As used herein, the terms "structure," "structural", and "structured" when used in this context are intended to be broadly interpreted as referring to inferred or defined relations between variables. Based on the type of model, the illustrative embodiment of FIG. 1 creates a structural model by data mining the structural information provided by the selected desirable solutions. In certain embodiments, the structural information may also be partly provided by previously selected solutions.

The structural model may be built explicitly, by forming a substructure, and/or may be formed implicitly, by gathering variables that are related to one another. A structural model may be, as a nonlimiting example, a probabilistic model that models conditional probabilities between variables. Generally, building the structural model includes data mining selected desirable solutions.

To build the structural model, a methodology is first selected to represent the model itself. Many different types of models may be useful including various representations such as marginal product models, Bayesian networks, decision graphs, models utilizing probability tables, directed graphs, statistical studies, and the like. More particular examples include such models as one or more of the Bayesian Optimization Algorithm (BOA), the Compact Genetic Algorithm (cGA), and the extended Compact Genetic Algorithm (ecGA). Other models that may be used include dependency structure matrix driven genetic algorithm (DMSGA), linkage identification by nonlinearity check (LINC), linkage identification by monotonicity detection (LIMD), messy genetic algorithm (mGA), fast messy genetic algorithm (fmGA), gene expression messy genetic algorithm (GEMGA), linkage learning genetic algorithm (LLGA), estimation of distribution algorithms (EDAs), generalized principal component analysis (GPCA), and non-linear principal component analysis (NLPCA). These and other models are well known to those knowledgeable in the art, and a detailed description is therefore not necessary herein.

Preferably, the representation scheme defines an assumed probabilistic model or a class of probabilistic models that can represent the promising solutions. If a class of probabilistic models is provided, a search method or mechanism may be used to search for an optimum model (e.g., a probabilistic model), and a class-selection metric may be used to choose a particular structural model from the admissible class.

A class-selection metric is used to distinguish between better model instances and worse ones. The class-selection metric may be used to evaluate alternative probabilistic models (e.g., models chosen from the admissible class). Generally, any metric that can compare two or more model instances or solutions is useful. Many selection metrics apply a score or relative score to model instances using some scoring metric. Different metrics such as, but not limited to, minimum description length (MDL) metrics and Bayesian metrics are two of several particular examples.

Given a model representation and a class-selection metric, the search method or mechanism is used to choose one or more better or best models from among the allowable subset members. An exemplary search method uses the class-selection metric to search among the admissible models for an optimum model. The search goals may vary depending on the model representation. As one non-limiting example, for marginal product models (MPM), both a structure including linked genes and values for probability parameters may be search goals.

Preferably, but not necessarily, local search methods such as greedy search heuristics are used for a search method or mechanism. An exemplary greedy search heuristic begins with models of a low level of complexity and then adds additional complexity when it locally improves the class-selection metric value. This exemplary process preferably continues until no further improvement is possible. After the structural model is built, a new solution set may be generated in some embodiments by sampling the structural model. Exemplary methods for creating a structural model will be apparent to those of ordinary skill in the art. However, the present invention is not limited to currently known model-building techniques, as to-be-known techniques may be able to be incorporated into embodiments of the present invention.

Given the structural model, the surrogate fitness model can be constructed (step 108). Generally, in embodiments of the present invention, the structural model created in step 106 is used to infer the form of the surrogate fitness model. This may be done, for example, by data mining the structural model. Preferably, construction of the surrogate fitness model includes both creating a structure and calibrating the structure to provide the surrogate fitness model. Exemplary, nonlimiting techniques for creating a surrogate fitness model are provided in U.S. patent application Ser. No. 11/343,195, cited above.

Generally, a structure may be created through steps of performing a discovery process, analysis, inference, or other extraction of knowledge to discover the most appropriate form of the structure. A genetic program could be used for this step, for example. Weighted basis functions are other examples of useful structures, with particular weighted basis functions including orthogonal functions such as Fourier, Walsh, wavelets, and others. Building a structure may include, for instance, inferring, deducing, or otherwise extracting knowledge of interaction of variables in a model such as the structural model in step 106 and using this knowledge to create the structural model.

In one illustrative example, the model includes variables, at least some of which interact with others. Creating a structure may include using knowledge of interaction of variables from the structural model in step 106. The form of the structure might then be groupings of variables that are known to interact with one another.

By way of additional example, if a simple probability model suggested that desirable solutions might be a particular set of strings of bits with probabilities predicting promising positions for 1's and 0's, creating a structure from these predicted promising bit strings may include determining which bits appear to interact with one another. The 1's and 0's in the various strings could be replaced in the structure with variables, with the knowledge of which variables interact with which other variables to relate the variables to one another. A polynomial structural model may then result.

The particular structure will depend on the particular type of model built. For example, if a probability model is built that includes a probability table(s) or matrice(s), the position of the probability terms in the table(s) or matrice(s) can be mapped into the structure. If the model built can be expressed in a graphical model of probabilities, the conditional probabilities indicated by the graph can be used to relate variables to one another. Examples of this include BOA. Mapping of a probability model's program subtrees into polynomials over the subtrees is still another example of creating a structure.

After creating the structure, creating the surrogate fitness model preferably includes calibrating the structure using the output of the fitness evaluation from block 103. Calibration may include, for example, adjusting the structure to improve its ability to predict or model desirable output. Steps of filtering, estimation, or other calibration may be performed. In other invention embodiments, the structure may be expressed with unknown parameters or coefficients. Calibration can then include fitting the parameters or coefficients by data mining the selected desirable solutions and/or by using the results of the fitness evaluation. Calibration may be performed anew each generation, or may be recursive. Recursive methods for creating a fitness surrogate model are preferred to conserve computational resources.

As a nonlimiting example, assume that the structure is expressed in the form of a polynomial with unknown constant coefficients. These coefficients can be determined through curve fitting using stored expensive fitness calculator output. A variety of particular steps of fitting the structure will be useful within the invention, and are generally known. Such a structure may be, as a nonlimiting example, a linear regression of a non-linear model. For example, steps may include linear regression using its various extensions, least squares fit, and the like. More sophisticated fitting may also be performed, with examples including use of genetic algorithms, heuristic search, table search, and simulated annealing.

In these embodiments, constructing a surrogate fitness model can include solving for the coefficient constants through curve fitting, linear regression, or other like procedures. It has been discovered that creating a structure in a form that includes coefficients, and then fitting those coefficients through a least squares fit are convenient and accurate steps for creating a surrogate fitness model.

Other steps of curve fitting in addition to performing a least squares fit may likewise be performed. For example, an additional step believed to be useful is to perform a recursive least squares fit. A step of performing a recursive least squares fit will provide the benefit of avoiding creating the model from the "ground up" on every iteration. Instead, a previously created model can be modified by considering only the most recently generated expensive data points from a database of previous expensive fitness calculations. In many applications, this may provide significant benefits and advantages. Those knowledgeable in the art will appreciate that many other known steps of fitting coefficients using stored data points will be useful.

Referring once again to FIG. 1, the structural model and/or the surrogate fitness model are analyzed (step 110) for information useful in performing efficiency enhancement techniques. For example, the structural model and/or the surrogate fitness model may be data mined. The type of analysis and which model(s) to use will vary depending on the type of efficiency enhancement desired. As nonlimiting examples, analyzing the surrogate fitness model may include inferring scaling and signal-to-noise ratio. Analyzing the structural model may include, as nonlimiting examples, inferring neighborhoods used by local-search operators, inferring a topology of a parallel function evaluation, and/or a topology of a parallel architecture. Further, analyzing the structural model and/or surrogate fitness model may include analyzing the structural model and/or surrogate fitness model in that particular iteration along with models from previous iterations (which may be, as a nonlimiting example, stored in a database after construction). This may provide, for example, changes in the structural model and/or surrogate fitness model, which may be useful in determining how building blocks are being solved.

Based on the analysis of the structural model and/or the fitness surrogate model, one or more efficiency enhancement techniques may be performed that affect generation of new solution sets, fitness evaluation of solutions, model building, etc. As one non-limiting example, if evaluation relaxation is to be used (step 112), the structural model may be used to infer the form of the surrogate model when forming the surrogate fitness model. The surrogate fitness model may be used to partially or fully replace the expensive fitness evaluation. Additionally, data mining the surrogate fitness model can provide criteria for determining the proportion of new solutions that are evaluated (step 103) using the surrogate fitness model and the expensive fitness evaluation. Exemplary criteria to consider are provided in U.S. patent application Ser. No. 11/343,195. Other examples of exemplary criteria that may be used with the surrogate fitness model are disclosed in Sastry, K., Pelikan, M. & Goldberg, D. E., "Efficiency enhancement of genetic algorithms via building-block-wise fitness estimation", Proceedings of the IEEE International Conference on Evolutionary Computation, 720-727, 2004; Pelikan, M. & Sastry, K., "Fitness inheritance in the Bayesian optimization algorithm", Proceedings of the Genetic and Evolutionary Computation Conference, 2, 48-59, 2004; and Sastry, K., Lima, C. F., & Goldberg, D. E., "Evaluation relaxation using substructural information and linear estimation", Proceedings of the 2006 Genetic and Evolutionary Computation Conference, 419-426, 2004. These documents are incorporated herein by reference.

As another example, if time continuation is to be used (step 114), the structural model may be used to infer the form of the surrogate fitness model, and the surrogate fitness model may be used to infer scaling, signal-to-noise ratio, etc., to decide an optimal proportion of crossover and mutation dominated search. In exemplary, non-limiting embodiments, the selected method for generating new solutions can be affected by the decided proportion. Exemplary criteria for time continuation that can be met by analyzing the structural model and/or the surrogate fitness model can be found in Sastry, K. and Goldberg, D. E., "Let's get ready to rumble: Crossover versus mutation head to head", Proceedings of the Genetic and Evolutionary Computation Conference, 2, 126-137, 2004; Sastry, K. & Goldberg, D. E., "Designing competent mutation operators via probabilistic model building of neighborhoods", Proceedings of the Genetic and Evolutionary Computation Conference, 2, 114-125, 2004; and Lima, C., Sastry, K., Goldberg, D. E., & Lobo, F., "Combining competent crossover and mutation operators: A probabilistic model building approach", Proceedings of the 2005 Genetic and Evolutionary Computation Conference, 735-742, 2005. These documents are incorporated herein by reference.

If hybridization is to be used (step 116), the structural model may be used to infer the form of the surrogate fitness model, and may also be used in particular embodiments to infer the neighborhoods used by local-search operators. The surrogate fitness model may used to optimally decide between the proportion of global and local search, to choose the best local search among the available local search methods, and/or to perform evaluations of solutions. Exemplary hybridization criteria that may be met by analyzing the structural model and/or the surrogate fitness model is disclosed in Goldberg, D. E. & Voessner, S., "Optimizing global-local search hybrids", Proceedings of the Genetic and Evolutionary Computation Conference, 220-228, 1999; Colletti, B. W. & Barnes, J. W., "Using group theory to construct and characterize metaheuristic search neighborhoods", In Rego, C. & B. Alidaee, B. (eds.), Adaptive Memory and Evolution: Tabu Search and Scatter Search, 303-329, Boston, Mass., 2004, Kluwer Academic Publishers; Vaughan, D., Jacobson, S. H., & Armstrong, D., "A new neighborhood function for discrete manufacturing process design optimization using generalized hill climbing algorithms", ASME Journal of Mechanical Design, 122(2), 164-171, 2000; and Lima., C. F., Pelikan, M., Sastry, K., Butz, M. V., Goldberg, D. E., & Lobo, F. G., "Substructural neighborhoods for local search in the Bayesian optimization algorithm", Parallel Problem Solving from Nature (PPSN IX), 232-241, 2006. These documents are incorporated herein by reference.

If parallelization is to be used (step 118), for example, the structural model may be used to infer the form of the surrogate, and may also be used to infer the topology of parallel function evaluation and/or to infer the topology of parallel architecture. The surrogate model may be used to optimally decide a parallel architecture and values of critical parameters for a parallel GA method. The surrogate fitness model may also be used for parallel function evaluation. Exemplary hybridization criteria that may be met by analyzing the structural model and/or the surrogate fitness model is disclosed in Cantú-Paz, E., "Efficient and accurate parallel genetic algorithms", Boston, Mass.: Kluwer Academic Publishers, 2000. This document is incorporated herein by reference.

It is to be understood that one or more of these efficiency enhancement techniques may be used, and others may be discarded as desired. However, it is preferred that if a fitness surrogate is constructed (step 108), at least some amount of evaluation relaxation is used, though this is not necessary. If more than one of evaluation relaxation (step 112), time continuation (step 114), hybridization (step 116), and parallelization (step 118) are used, logic of modeling and interactions may be used to determine a proper balance for each of the techniques used. Those of ordinary skill in the art will appreciate the logic of modeling and interactions that may be considered, and a detailed description therefore will be omitted herein.

Referring once again to FIG. 1, a step of generating new solutions is performed in block 120. The new solutions may collectively be thought of as a new solution set. There are various particular steps suitable for accomplishing this. For example, a model may be used to generate new solutions. The model may be a different model than a previously built model, including the structural model built in step 106. It may be any of a variety of models, for example, that use the desirable solutions selected in block 104 to predict other desirable solutions. Probabilistic models, predictive models, genetic and evolutionary algorithms, probabilistic model building genetic algorithms (also known as estimation of distribution algorithms), Nelder-Mead simplex method, tabu search, simulated annealing, Fletcher-Powell-Reeves method, metaheuristics, ant colony optimization, particle swarm optimization, conjugate direction methods, memetic algorithms, and other local and global optimization algorithms may be used. The step of block 120 may therefore itself include multiple sub-steps of model creation. In this manner, the method of FIG. 1 and other invention embodiments may be "plugged into" other models to provide beneficial speed-up in evaluation. Other efficiency enhancement techniques such as hybridization (step 116) and parallelization (step 118) may be used to further speed up evaluation depending on the decisions made during these steps.

In other invention embodiments, the step of generating new solutions of block 120 may include sampling the structural model built in block 106 to create new solutions. Sampling may comprise, for example, creating a new plurality or even multiplicity of solutions according to a probability distribution from a structural model. Because the structural model built in step 106 was built using promising solutions to predict additional promising solutions, the sampled solutions that make up the second solution set are presumably of a higher quality than the initial solution set.

The step of generating a new solution set (step 120) preferably is based at least in some way on decisions made during one or more of the time continuation, hybridization, and/or parallelization steps (114, 116, 118). As a nonlimiting example, generating a new solution set may include some proportion of model sampling and local sequential search, such as, but not limited to, crossover and mutation. The decisions made in the time continuation step (step 114) may be used to determine the proportion of crossover and mutation when the new solution set is generated. As another example, the proportion of local and global search may be determined using the hybridization step (116), and this proportion may be used to create a new solution set. If parallelization is used (step 118), the solution set may be generated at least in part based on a parallel architecture and parameters decided in the parallelization step.

A step of determining whether completion criteria have been satisfied is then performed (step 122). Alternatively, this step may take place at an earlier time in the overall process. This step may include, for example, determining whether some externally provided criteria are satisfied by the new solution set (or by a random or other sampling of the new solution set). By way of some examples, if the problem at hand is the design of a bridge, completion criteria may include a desired bridge weight maximum, a desired minimum stress failure limit, and a maximum deflection. If the problem at hand concerns a financial model for investing funds, the criteria may be measures of rate of return, volatility, risk, and length of investment. If the problem at hand is related to the trajectory of a missile or asteroid, convergence criteria can include one or more final calculated trajectories, velocities, impact locations, and associated margins of error. If the problem at hand is related to optimizing a circuit design, criteria may include maximum impedance, resistance, and delay.

If the criteria have not been satisfied, a step of replacement is performed to replace all or a portion of the first solution set with the new (step 123). In many methods of the invention, the entire initial solution set is replaced. In other methods, only a portion of the initial set is replaced with the new solutions. Criteria may define what portion is replaced, which criteria may change dynamically with number of iterations, quality of solutions, or other factors. The method then continues for subsequent iterations with the overall quality of the solutions increasing until the completion criteria are satisfied (step 124).

It has been discovered that a significant speed-up in methods for optimizing solution sets can be obtained by analyzing structural models and/or surrogate fitness models, and performing efficiency enhancement techniques based on this analysis. Particular benefits for speed-ups may be provided when the efficiency enhancement techniques automatically and adaptively incorporate the knowledge of regularities of the search problem. This can be accomplished, for example, by incorporating knowledge of the interactions of variables in the structural model. One nonlimiting exemplary class of probabilistic models that automatically identify important regularities in the search problems is probabilistic model building genetic algorithms (PMBGAs). These have been discovered to be of particular utility in methods of the invention, though it is not required to use such types of GAs.

It is also contemplated to combine several such techniques to operate in concert. For example, it is known that, assuming independence of different efficiency enhancement sources, the total speedup of an enhanced procedure will be product of the sources of speedup; that is:

$$S_{overall} = S_{competence} * S_{parallel} * S_{relaxation} * S_{continuation} * S_{hybridization}$$

This multiplicative enhancement can be substantial. However, tight integration of probabilistic model building and one or more efficiency enhancement techniques may in some cases yield supermultiplicative improvements that may be, for example, several orders of magnitude above improvements obtained independently.

Take the case of parallelization, for example. Structural information about the problem being solved may be used to use parallel processing capability more effectively, according to the embodiment shown in FIG. 1. Cantú-Paz, *Efficient and accurate parallel genetic algorithms*, Boston, Mass.: Kluwer Academic Press, 2000, develops essential theory confirmed by experimental results to help design effective parallel genetic algorithms. These ideas may be used together with the structural information learned in probabilistic model building procedures to best utilize different kinds of parallel computing.

As to evaluation relaxation, tight integration with probabilistic model building also can produce significant speedup. For example, fitness inheritance, a type of evaluation relaxation, constructs a simple surrogate fitness evaluation by taking the fitness of a child as the average or a weighted average of the parents' fitness values. It has previously been demonstrated that substantial speedups are possible by using existing probabilistic model building techniques and an ad hoc endogenous fitness estimator. Improvements are possible by using the information learned about the problem structure through probabilistic model building to create an accurate fitness surrogate. The structure of the probabilistic model determines the structure of the fitness surrogate and thereafter, it is a relatively straightforward matter to take a stream of actual fitness evaluations to fit the parameters of the surrogate. Because the structure of the surrogate is appropriate to the structure of the landscape in the neighborhood of the best solutions, the resulting fitness estimation is of high quality and low cost.

More particularly, in evaluation relaxation, an accurate, but computationally expensive fitness evaluation model may be replaced by a less accurate, but computationally inexpensive fitness estimation method. The source for fitness estimation can either be endogenous as in fitness inheritance or exogenous, as in surrogate fitness functions. In fitness inheritance, offspring fitness is inherited from the fitness values of its parents with a probability, $p_i$, called the inheritance probability. The inherited fitness of an offspring is computed as either average fitness of the two parents or weighted average of parental fitness values.

Known simple fitness inheritance methods do not consider the BBs identified by probabilistic models. However, we can effectively use the substructural information provided by probabilistic model-building methods and other competent GAs for accurate and rapid estimation of fitness of candidate solutions.

Using facetwise and dimensional analysis, we can also predict the scalability and speedup obtained using substructural fitness information provided by probabilistic model building GAs to estimate the fitness of candidate solutions:

$$S_{relaxation} = \frac{1}{(1 + p_i)^{1.5}(1 - p_i)}$$

Figure 2:
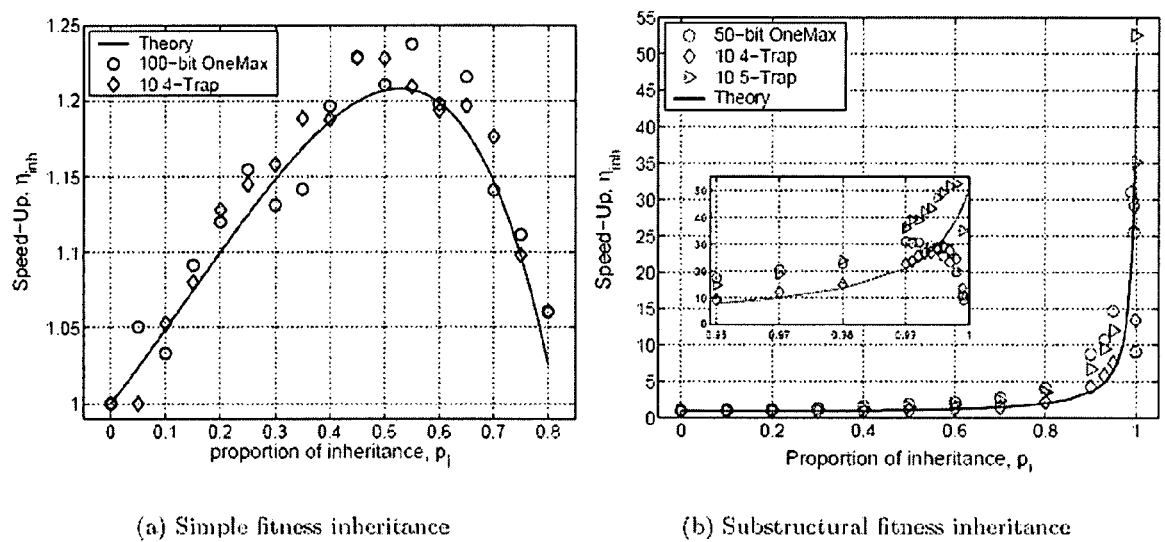
FIG. 2 shows exemplary speed-up times for a simple fitness mechanism and a mechanism using substructural fitness inheritance.

The results of using substructural information in fitness estimation indicates that only 1% of the individuals need fitness evaluation (the remaining 99% are estimated through fitness inheritance) and yield a speedup of 30-53, as shown in FIG. 2. This is in contrast to a modest speedup of 1.3 provided by a simple inheritance mechanism that does not exploit the substructural information.

The estimation of substructural fitnesses can be significantly improved by using least squares and recursive least squares methods. The usage of least-square estimate not only makes the fitness estimation procedure more robust for deterministic problems, but also makes it tractable to use with noisy, overlapping, and hierarchical fitness functions. Furthermore, using substructural fitness basis—for which the population scales as $O(2^k m \log m)$—is significantly efficient over using polynomial kernel in support vector machines—for which the population scales $O(l^k)$, where k is the BB size, and m is the number of BBs. It appears that speedups that can be achieved by using a least-squares estimate of substructural fitness are significantly greater than those obtained to date.

Regarding hybridization, probabilistic model building may be used to choose an appropriate balance between the probabilistic model building algorithm and a local search or an array of local search procedures. This objective may be subdivided into two subgoals: inducing neighborhoods and balancing global versus local steps. Though the importance of choosing effective neighborhoods for local search is known, this has typically been addressed by constructing fixed neighborhoods based on prior knowledge of the problem. According to embodiments of the present invention, effective neighborhoods are learned based on appropriate sampling of the evaluation function and then the neighborhoods so induced are used for further exploration. This exploitation of the structural information available in a probabilistic model builder can be mined and used to determine an optimal hybrid between local and global moves. This can, for example, address the problem of deciding whether to use GAs or a different method at a particular point when solving a problem, allowing optimal use of both (or several) techniques.

One purpose of exemplary methods of the present invention is to decide between such a tradeoff by identifying the appropriate population size regime, and whether global or local operators (or some proportion of each) should be used in the presence of different sources of problem difficulty. This results in significant savings that depend on the type of problem being solved, as substantial speedups are available to algorithms that match problem structure and solution method well.

A discussion of one or more embodiments incorporating time continuation and model building follows. Since the early days in the genetic and evolutionary computation (GEC) field, there has been discussion concerning the benefits of crossover versus mutation and vice-versa. Crossover and mutation search a genotype space in different ways and with different resources. While crossover needs large populations to combine the necessary information effectively, mutation works best when applied to small populations during a large number of generations.

In GAs, significant attention has been paid to the design and understanding of recombination operators to provide crossover. Systematic methods of successfully designing competent selectorecombinative GAs have been developed based on decomposition principles. Depending on the technique used to discover the problem decomposition, competent selectorecombinative GAs can be classified into categories such as perturbation techniques, linkage adaptation techniques, and probabilistic model building techniques.

Mutation, on the other hand, is usually a secondary search operator, which performs a random walk locally around a solution and therefore has received far less attention. However, in evolutionary strategies (ESs), where mutation is the primary search operator, significant attention has been paid to the development of mutation operators. Several mutation operators, including adaptive techniques, have been proposed. The mutation operators used in ESs are powerful. Yet, when solving boundedly difficult GA-hard problems, local neighborhood information is not sufficient, and a mutation operator that uses local neighborhood requires $O(l^k \log l)$ function evaluations (where l is the problem size and k the BB size). In this case, for moderate values of k, the number of evaluations grows extremely fast, and the search becomes inefficient compared to competent GAs.

It has been shown that there are important features of crossover and mutation operators not captured by the other. This provides a theoretical justification for the fact that the role of crossover is the construction of high-order structurally learned probability distributions (e.g., building blocks) from low-order ones. Clearly, mutation cannot perform this role as well as crossover. However, in terms of disruption, mutation can provide higher levels of disruption and exploration, but at the expense of preserving alleles common to particular defining positions.

Sastry and Goldberg, "Let's get ready to rumble: crossover versus mutation head to head", *Proceedings of the Genetic and Evolutionary Computation Conference*, 2, 126-137, 2004, analyzed the relative advantages between crossover and mutation on a class of deterministic and stochastic additively separable problems. For that study, the authors assumed that the crossover and mutation operators had perfect knowledge of the problem structure and effectively exchanged or searched among competing BBs. They used facetwise models of convergence time and population sizing to determine the scalability of each operator-based algorithm. The analysis shows that for additively separable deterministic problems, the BB-wise mutation is more efficient than crossover, while for the same problems with additive Gaussian noise, the crossover-based algorithm outperforms the mutation approach. The results show that the speed-up of using BB-wise mutation on deterministic problems is $O(\sqrt{k} \log m)$, where k is the BB size and m is the fixed number of BBs. In the same way, the speed-up of using crossover on stochastic problems with fixed noise variance is $O(\sqrt{km}/\log m)$. Thus, the robustness and strength of GAs lies in using both crossover and mutation. In some ways, this approach relates to hybridization optimization.

Exemplary embodiments of the present invention concern the efficiency-enhancement capabilities of combining competent recombination and mutation operators. Exemplary methods identify the underlying structure of the search problem, and this structure can be used to perform effective recombination of building blocks that provides rapid global-search capabilities, and to perform effective search in the building-block neighborhood that locally provides high-quality solutions.

One important idea exploited by an aspect of the invention is to obtain the best from both recombination and mutation approaches to use the time budget available efficiently to achieve near-optimal solutions. Such embodiments of the present invention are a form of time continuation, since the knowledge incorporated in the local operator comes from the probabilistic model of the population, rather than from previous problem information as with hybridization.

Generally, such embodiments of the present invention provide adaptive time continuation, in which the choice between crossover and mutation relies on the identification of problem difficulty facets such as near-uniform versus near-exponential salience, and deterministic versus noisy optimization problems. Together with the problem decomposition knowledge, entropy measure of the subsets distribution can be used to determine if subfunctions (subproblems that compose the original problem being solved) are being solved in parallel or sequentially by the genetic algorithm, revealing the presence either of uniformly or exponentially (or an intermediate case) salient building blocks. For identification of deterministic versus noisy problems, a preliminary sampling procedure can be used to determine if the fitness variance is significant to be considered to interfere (or not) with the decision-making between partial solutions for the problem.

In this manner, exemplary methods of the present invention are useful to adjust problem solving dynamically by adapting the search strategy to the domain features of the problem being solved. For example, often a user is presented with a fixed, limited amount of computational resource (e.g., computing time). In time continuation, a choice must be made between, for example, using a large pool of solutions but not having time to fully converge, or using a smaller, more limited pool of solutions but being able to come closer to convergence. Aspects of the present invention provide steps for analyzing the problem at hand to make the best choice between these alternatives. Some methods of the invention can continuously update—they may make one change on an early iteration and a different one on a later iteration.

Such methods allow one to save a significant number of function evaluations by using the most appropriate search operator, whether mutation or crossover-based, to the problem being considered. The choice of the population size, a critical parameter in genetic and evolutionary algorithms, can also be done based on on-the-fly estimation of problem difficulty dimensions such as epistasis, salience, and external noise. In prior art time continuation methods, by contrast, operations and parameters are chosen, and runs are conducted. Both choices, population size and local versus global operators, being done by problem basis in an adaptive manner, insights on the quest for a black-box optimization method are also gained.

Preferred embodiments of the present invention concern using probabilistic-model-building-based operators to provide a competent hybrid GA. In probabilistic model-building genetic algorithms (PMBGAs) the variation operators are replaced by building and sampling a probabilistic model of promising solutions. This procedure tries to mimic the behavior of an ideal crossover operator, where the BBs are mixed without disruption. Embodiments of the present invention provide a competent hybrid GA that combines a BB-wise crossover operator with a BB-wise mutation operator via probabilistic model building. This approach is referred to herein as a probabilistic model building hybrid genetic algorithm (PMBHGA). Conceptually, a PMBHGA is different from a typical hybrid PMBGA at least in the sense that the local search that is performed is based on the probabilistic model instead of using specific problem knowledge. This turns the present PMBHGA into a more generally applicable hybridization.

According to a preferred embodiment of the present invention, methods are provided for hybridization of a competent recombination operator that effectively exchanges key substructures of the problem, and a competent mutation operator is provided that efficiently searches for best substructures in the building blocks (BBs) partition. Specifically, the probabilistic model-building methodology of the PMBGA is used to determine the effective problem decomposition and the important substructures (or BBs) of the underlying search problem. The probabilistic model, which automatically induces good neighborhoods, is subsequently used for two distinct purposes:

1. Sampling from a population model, e.g., effective recombination of BBs that provides rapid global-search capabilities.

2. Local sequential search, e.g., effective search in the BB neighborhood that locally provides high-quality solutions.

The key idea is to obtain the benefits from both approaches, recombination without disrupting the BBs, and mutation (local search) that rapidly searches for the best BBs in each partition.

One known PMBGA is the extended compact genetic algorithm (eCGA), described in Harik, G., "Linkage learning via probabilistic modeling in the ECGA", IlliGAL Report No. 99010, Urbana, Ill.: University of Illinois at Urbana-Champaign. As with other model builders, such as the Bayesian optimization algorithm (BOA), the eCGA has been successful in tackling large difficulty problems with little or no prior problem knowledge across a spectrum of problem areas.

An exemplary mutation operator based on this probabilistic model building procedure is the building-block-wise mutation algorithm (BBMA), which is a BB-wise mutation operator that performs local search in the building block space. A more particular example of the BBMA is the extended compact mutation algorithm (eCMA), which is described in Sastry and Goldberg, "Designing competent mutation operators via probabilistic model building of neighborhoods", *Proceedings of the Genetic and Evolutionary Computation Conference*, 2, 114-125, 2004.

In an exemplary PMBHGA described herein, both operators are based on the probabilistic procedure of the eCGA. The model sampling procedure of eCGA, which mimics the behavior of an idealized recombination—where BBs are exchanged without disruption—is used as the competent crossover operator. On the other hand, the eCMA—which uses the BB partition information to perform local search in the BB space—is used as the competent mutation operator. The resulting exemplary PMBHGA, referred to herein as a hybrid extended compact genetic algorithm (heCGA), makes use of the problem decomposition information for 1) effective recombination of BBs and 2) effective local search in the BB neighborhood.

Embodiments of the present invention are tested on different problems that combine the core of three well-known problem difficulty dimensions: deception, scaling, and noise. Results show that, in the absence of domain knowledge, the hybrid approach is more robust than either single-operator-based approach.

To illustrate the differences and advantages of the PMBHGA and more particularly the heCGA, a brief description of the related GA methods is presented. The eCGA is based on the idea that the choice of a good probability distribution for promising solutions is equivalent to linkage learning. It uses a product of marginal distributions on a partition of genes. This kind of probability distribution belongs to a class of probability models known as marginal product models (MPMs). For example, the following MPM, [1, 3] [2][4], for a 4-bit problem represents that the $1^{st}$ and $3^{rd}$ genes are linked, and the $2^{nd}$ and $4^{th}$ genes are independent. For linear (all-variables independent) problem, an order-3 additively decomposable problem, and an order-4 additively decomposable problem, representation may be illustrated as follows:

Linear: $[x_1][x_2][x_3][x_4][x_5][x_6][x_7][x_8][x_9][x_{10}][x_{11}][x_{12}]$

Order-3: $[x_1x_2x_3][x_4x_5x_6][x_7x_8x_9][x_{10}x_{11}x_{12}]$

Order-4: $[x_1x_2x_3x_4][x_5x_6x_7x_8][x_9x_{10}x_{11}x_{12}]$

In the eCGA, both the structure and the parameters of the model are searched and optimized to best fit the data (promising solutions). The measure of a good MPM is quantified based on the minimum description length (MDL) principle, which penalizes both inaccurate and complex models, thereby leading to an optimal distribution. According to this principle, good distributions are those under which the representation of the distribution using the current encoding, along with the representation of the population compressed under that distribution, is minimal. Formally, the MPM complexity is given by the sum of model complexity, $C_m$, and compressed population complexity, $C_p$. The model complexity, $C_m$, quantifies the model representation in terms of the number of bits required to store all the marginal probabilities. Let a given problem of size l with binary encoding, have m partitions with $k_i$ genes in the $i^{th}$ partition, such that $$\sum_{i=1}^{m} k_i = l.$$

Then each partition i requires $2^{k_i}-1$ independent frequencies to completely define its marginal distribution. Taking into account that each frequency is of size $\log_2(n+1)$, where n is the population size, the model complexity $C_m$ is given by $$C_m = \log_2(n+1) \sum_{i=1}^{m} (2^{k_i} - 1)$$

The compressed population complexity, $C_p$, quantifies the data compression in terms of the entropy of the marginal distribution over all partitions. Therefore, $C_p$ is given by $$C_p = n \sum_{i=1}^{m} \sum_{j=1}^{2^{k_i}} -p_{ij} \log_2(p_{ij})$$

where $p_{ij}$ is the frequency of the $j^{th}$ gene sequence of the genes belonging to the $i^{th}$ partition. In other words, $p_{ij} = N_{ij}/n$, where $N_{ij}$ is the number of chromosomes in the population (after selection) possessing bit sequence $j \in \lfloor 1, 2^{k_i} \rfloor$ for the $i^{th}$ partition. Note that a BB of size k has $2^k$ possible bit sequences, where the first is denoted by 00.0 and the last by 11.1.

The general steps in an eCGA are:
1) create a random population of n individuals;
2) evaluate all individuals in the population;
3) apply s-wise tournament selection;
4) model the selected individuals using a greedy MPM search procedure;
5) generate a new population according to the MPM found in step 4);
6) if stopping criteria is not satisfied, return to step 2.

An example of s-wise tournament selection is described in Goldberg, Korb, and Deb, "Messy genetic algorithms: Motivation, analysis, and first results", *Complex Systems*, 3(5), 493-530, 1989, which is incorporated herein by reference.

The eCGA is similar to a traditional GA, where crossover is replaced by probabilistic model building and sampling procedures. The offspring population is generated by randomly choosing subsets from the current individuals, according to the probabilities of the subsets stored in the MPM.

The eCGA performs a greedy MPM search at every generation. The greedy search starts with the simplest possible model, assuming that all variables are independent (as with the compact GA (Harik, Lobo, & Goldberg, 1999)), and then keeps merging partitions of genes whenever the MDL score metric is improved. All possible merges of two subsets are considered. This process goes on until no further improvement is possible. An algorithmic description of this greedy search can be found in, for example, Sastry & Goldberg, "Designing competent mutation operators via probabilistic model building of neighborhoods", Proceedings of the Genetic and Evolutionary Computation Conference, 2, 2004, 114-125, which is incorporated herein by reference.

Analytical models have been developed for predicting the scalability of PMBGAs. In terms of number of function or fitness evaluations necessary to converge to the optimal solution, these models predict that for additively separable problems, the eCGA scales subquadratically with the problem size: $O(2^k m^{1.5} \log m)$.

The exemplary probabilistic model building BB-wise mutation algorithm (BBMA) is a selectomutative algorithm that performs local search in the BB neighborhood. It induces good neighborhoods as linkage groups. Instead of using a bit-wise mutation operator that scales polynomially with order k as the problem size increases, the BBMA uses a BB-wise mutation operator that scales subquadratically, as shown by Sastry and Goldberg, "Designing competent mutation operators via probabilistic model building of neighborhoods", Proceedings of the Genetic and Evolutionary Computation Conference, 2, 2004, 114-125, which is incorporated herein by reference. For BB identification, an exemplary BBMA, the extended compact mutation algorithm (eCMA), uses the probabilistic model building procedure of eCGA. However, other probabilistic model building techniques can be used with similar or better results. Once the linkage groups are identified, an enumerative BB-wise mutation operator (e.g., as disclosed in Sastry and Goldberg, "Let's get ready to rumble: Crossover versus mutation head to head", Proceedings of the Genetic and Evolutionary Computation Conference, 2, 2004, 126-137) is used to find the best schema for each detected partition. The resulting mutation varies between bit-wise and BB-wise, and a search varies between hillclimbing and deterministic or random.

The general steps of the eCMA are:
1) create a random population of n individuals and evaluate their fitness;
2) apply s-wise tournament selection (Goldberg, Korb, & Deb, 1989, cited above);
3) model the selected individuals using a greedy MPM search procedure;
4) choose the best individual of the population for BB-wise mutation;
5) for each detected BB partition:
  5.1) create $2^k-1$ unique individuals with all possible schema in the current BB partition (the rest of the individual remains the same and equal to the best solution found so far); and
  5.2) evaluate all $2^k-1$ individuals and retain the best for mutation in the other BB partitions.

The performance of the BBMA can be slightly improved by using a greedy heuristic to search for the best among competing BBs in each partition. Even so, the scalability of BBMA is determined by the population size required to identify the BB partitions accurately. It has previously been shown that the number of function evaluations scales as $o(2^k m^{1.05}) \leq n_{fe} \leq o(2^k m^{2.1})$.

It should be also noted that in BBMA the linkage identification is only done at the initial stage. This kind of offline linkage identification works well on problems of nearly equal salience. However, for problems with non-uniformly scaled BBs, the linkage information needs to be updated at regular intervals, as will be explained further below.

eCGA and eCMA are examples of competent operators for solving additively decomposable hard problems, both based on the probabilistic model building procedure of eCGA. According to an exemplary, non-limiting embodiment of the present invention, the same procedure may be used to build the probabilistic model and combine both operators in the same algorithm to provide a BB-wise hybrid GA. As with eCGA, an exemplary BB-wise hybrid GA, referred to as the hybrid extended compact genetic algorithm (heCGA), models promising solutions to be able to effectively recombine the BBs and perform effective local search in their space.

Figure 3:
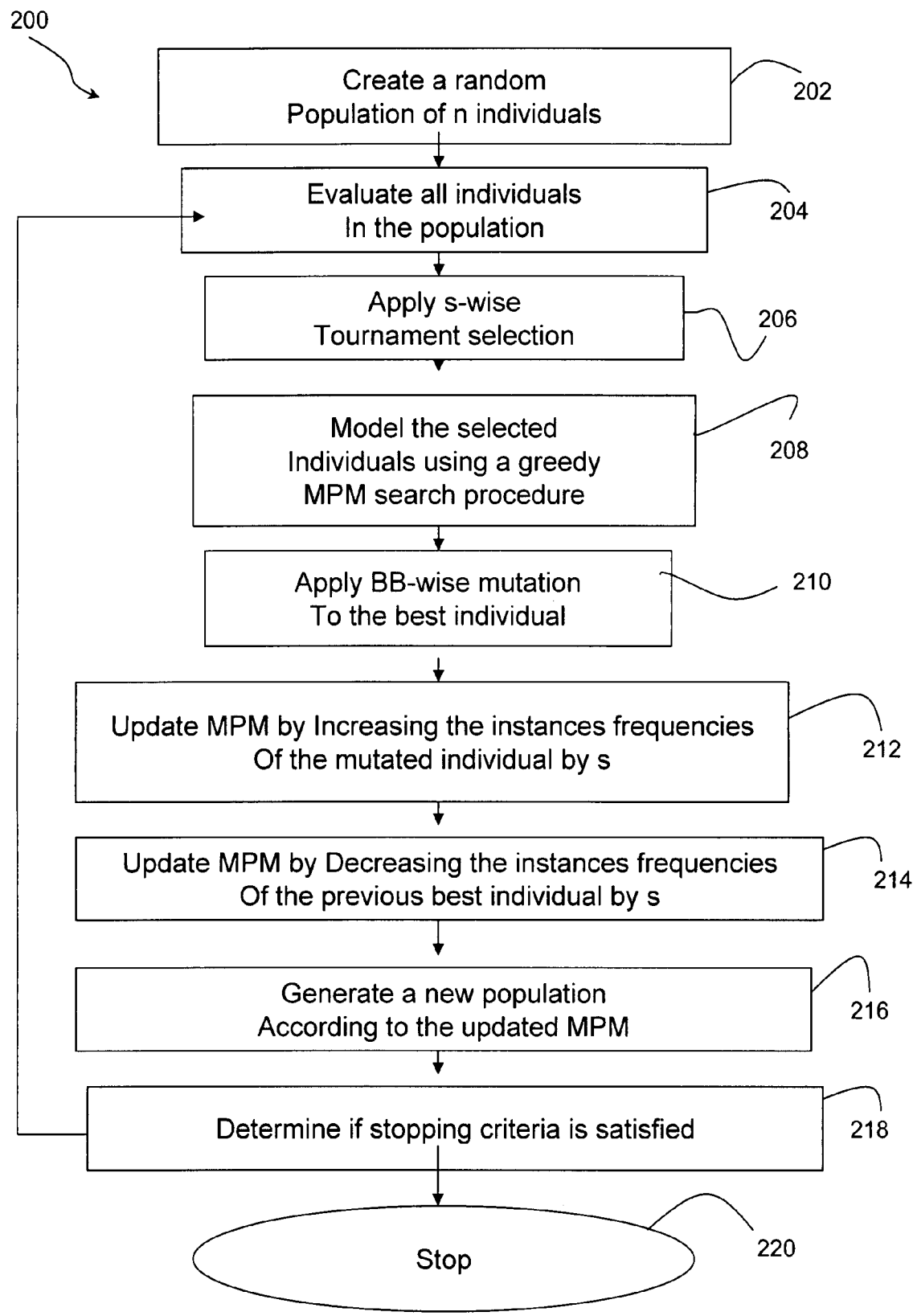
FIG. 3 shows steps in a hybrid extended compact genetic algorithm (heCGA), according to embodiments of the present invention.

An example of the heCGA method 200 is shown in FIG. 3. The general steps are:
1) create a random population of n individuals (step 202);
2) evaluate all individuals in the population (step 204);
3) apply s-wise tournament selection (Goldberg, Korb, & Deb, 1989, cited above) (step 206);
4) model the selected individuals using a greedy MPM search procedure (step 208);
5) apply BB-wise mutation to the best individual (step 210);

6) update the frequencies of the MPM found in step 4 according to the BB instances present on the mutated individual, including:
    6.1) increase the BB instances frequencies of the mutated individual by s (step 212);
    6.2) decrease the BB instances frequencies of the previous best individual by s (step 214);
7) generate a new population according to the updated MPM (step 216);
8) if stopping criteria is not satisfied (step 218), return to step 2 (step 204).

The heCGA starts similarly to the eCGA (steps 1-4), but after the model is built the linkage information is used to perform BB-wise mutation (local search) in the best individual of the population. After that, heCGA updates the model parameters (BB frequencies) of the model (from step 4) based on the BB instances of the mutated solution. This is done by increasing the frequency of each BB instance of the new best individual (the one that was mutated) by s and decreasing each BB instance of the previous best solution by s, where s is the number of individuals that participate in each selection tournament.

As a non-limiting example, for a model found:
$[x_1 x_2 x_3][x_4 x_5 x_6][x_7 x_8][x_9]$,
and a best individual of the population 000 011 010,
a mutated version of the best individual may be 111 111 00 0,
and frequencies may be updated as shown in the following table:

| $p(x_1 x_2 x_3)$ | | $p(x_4 x_5 x_6)$ | | $p(x_7 x_8)$ | | $p(x_9)$ | |
|---|---|---|---|---|---|---|---|
| ... | ... | ... | ... | ... | ... | ... | ... |
| 000 | 0.11 − s/n | 011 | 0.18 − s/n | 01 | 0.23 − s/n | 0 | 0.44 |
| ... | ... | ... | ... | ... | ... | ... | ... |
| 111 | 0.03 + s/n | 111 | 0.02 + s/n | 00 | 0.31 + s/n | ... | ... |
| ... | ... | ... | ... | ... | ... | ... | ... |

It is also contemplated to replace the copies of the best individual by the mutated one, with a similar overall effect (If tournament selection without replacement is used the best individual gets exactly s copies. However, when using tournament selection with replacement the best individual will get s copies on average, but can also get 0 or n copies. Therefore, it is preferred to use tournament selection without replacement.) Finally, an exemplary method generates a new population according to the updated model, and repeats these steps until some stopping criteria is satisfied.

eCGA, and consequently eCMA and heCGA, can only build linkage groups with non-overlapping genes. However, the BB-wise mutation operator and the BB-wise hybrid GA can be extended to other linkage identification techniques that can handle overlapping BBs such as, but not limited to, the Bayesian optimization algorithm (BOA) or the dependency structure matrix driven genetic algorithm (DSMDGA).

As stated above, the performance of the BB-wise mutation operator can be slightly improved using a greedy procedure to search for the best among competing BBs. This can be particularly useful if one considers other ways to integrate BB-wise mutation with BB-wise crossover. An alternative way to combine these operators would be to apply a stochastic BB-wise mutation to all individuals in the population. This way, instead of having the traditional bit-wise mutation with a certain probability to be applied to each bit, one would have a BB-wise mutation with a certain probability to be applied to each BB partition in each individual. In this kind of scheme it is important to spend less than $2^k-1$ function evaluations when searching for each optimal BB schema, especially if one uses high probabilities of applying BB-wise mutation. Another approach is to heuristically choose which individuals will be BB-mutated, and instead of mutating all BBs just mutate one or some randomly (or again heuristically) chosen. For example, a clustering criteria can be used where only the centroid of each cluster is mutated.

In an exemplary operation of the inventive heCGA, a hybrid scheme using a deterministic BB search is used. Computational experiments were performed in various problems of bounded difficulty. Following a design approach to problem difficulty, the described algorithms are tested on a set of problems that combine the core of three well-known problem difficulty dimensions: 1) intra-BB difficulty—deception; 2) inter-BB difficultly—scaling; and 3) extra-BB difficulty—noise. For that, we assume that the problem at hand is additively decomposable and separable, such that $$f(X) = \sum_{i=0}^{m-1} f_i(x_{I_i})$$

where $I_i$ is the index set of the variables belonging to the $i^{th}$ subfunction. As each subfunction is separable from the rest, each index set $I_i$ is a disjoint tuple of variable indexes.

For each algorithm, we empirically determine the minimal number of function evaluations to obtain a solution with at least m−1 building blocks solved; that is, the optimal solution with an error of $\alpha=1/m$. For each eCGA, and eCMA, we use a bisection method over the population size to search for the minimal sufficient population size to achieve a target solution. However, for heCGA, an interval halving method is more appropriate given the algorithm behavior as the population increases, as will be shown below. The results from the minimal sufficient population size are averaged over 30 bisection runs. In each bisection run, the number of BBs solved with a given population size is averaged over another 30 runs. Thus, the results for the number of function evaluations and the number of generations spent are averaged over 900 (30× 30) independent runs. For all experiments, tournament selection without replacement is used with size s=8.

Deception

At the core of intra-BB difficulty, deceptive functions are among the most challenging problems for competent GA candidates. These kinds of functions normally have one or more deceptive optima that are far away from the global optimum and that mislead the search in the sense that the attraction area of the deceptive optima is much greater than the one of the optimal solution. A well-known deceptive function is the k-trap function, defined as follows:

$$f_{trap}(u) = \begin{cases} 1 & \text{if } u = k \\ 1 - d - u * \frac{1-d}{k-1} & \text{otherwise} \end{cases}$$

where u is the number of 1s in the string, k is the size of the trap function, and d is the fitness signal between the global optimum and the deceptive optimum. In the experiments described below we use d=1/k. Considering m copies of this trap function, the global boundedly deceptive function is given by $$f_d(X) = \sum_{i=0}^{m-1} f_{trap}(x_{ki}, x_{ki+1}, \ldots x_{ki+k-1})$$

Figure 4:
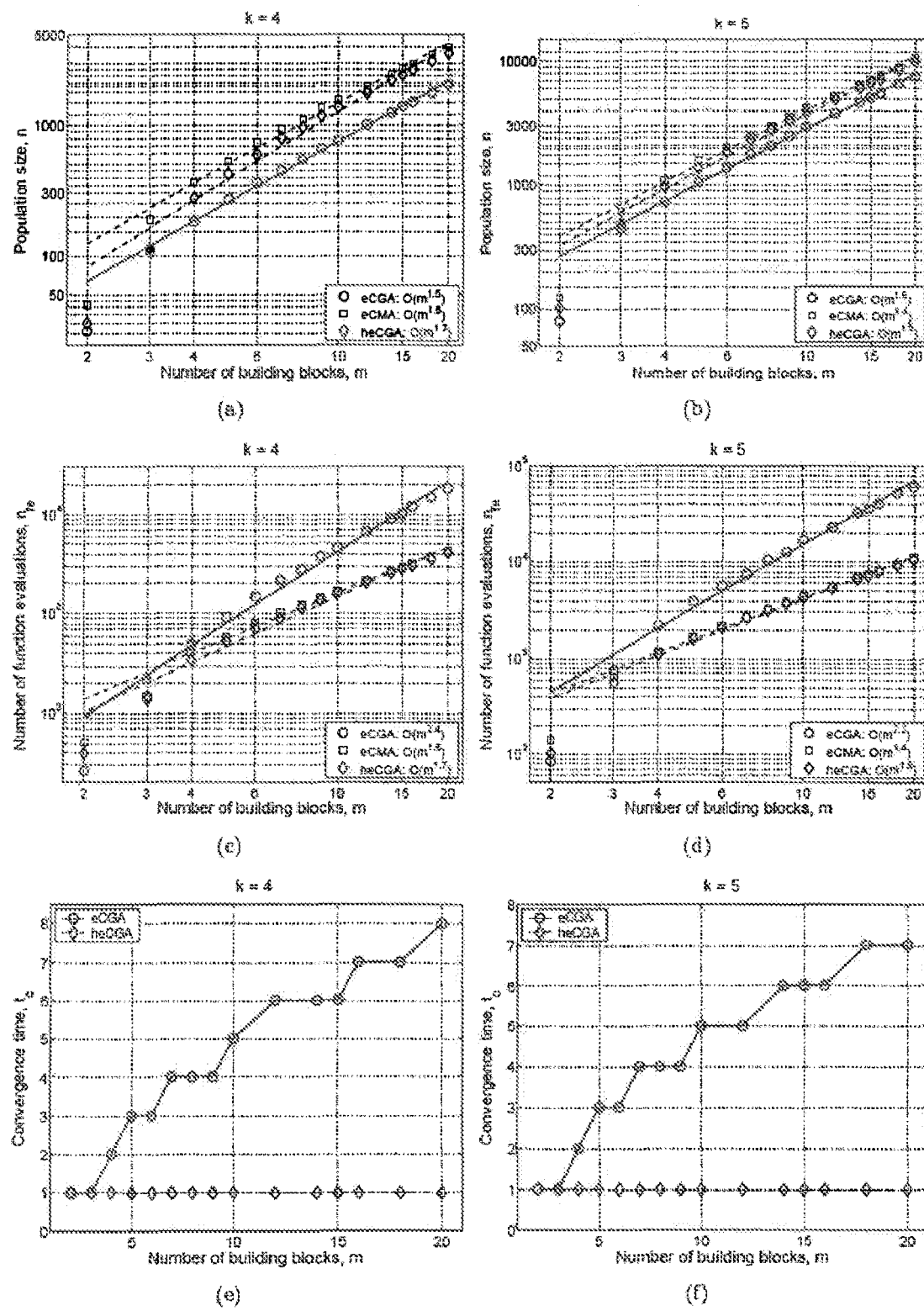
FIG. 4 shows population sizes, number of function evaluations, and convergence times for an exemplary heCGA operation for a boundedly deceptive function, compared to operation of an extended compact genetic algorithm (eCGA) and an extended compact mutation algorithm (eCMA)

FIG. 4 presents the results obtained for the boundedly deceptive function. The number of BBs (or subfunctions) is varied between 2 and 20, for k={4, 5}. For example, where k=4, d=0.25. As we can see, eCGA needs smaller populations than eCMA and heCGA to solve the problem; however, eCGA takes more function evaluations than both algorithms. This happens because in eCGA (1) the BBs are discovered in a progressive way and 2) more generations are required to exchange the right BBs. Although increasing the population size for eCGA accelerates the BB identification process, additional generations are still needed to mix the correct BBs into a single individual. Since eCGA (like every selectorecombinative GA) always has to spend this mixing time, relaxing the BB identification process (using smaller populations, thus saving function evaluations) to a certain point seems to be the best way to tune eCGA performance.

The scalability difference between eCGA and eCMA is not surprising and has been previously verified. The similarity between eCMA and heCGA performances leads us to conclude that the best way to use heCGA on deterministic and uniformly scaled boundedly deceptive functions, and the problems that are bounded by this one, is to set a large enough population size to get the problem structure in the first generation, and then perform BB local search to achieve the global optimum.

Figure 5:
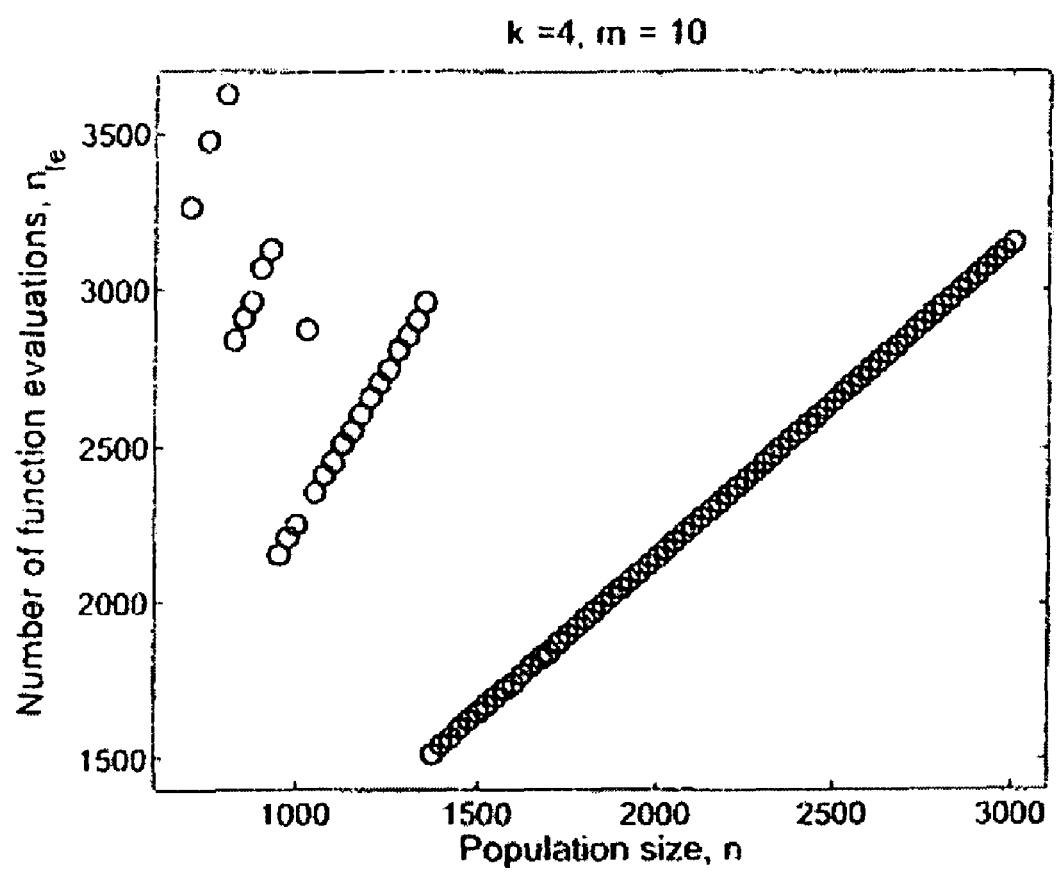
FIG. 5 shows the number of function evaluations to get a target solution for heCGA, where k=4 and m=10 for the boundedly deceptive function.

The results shown in FIG. 4 suggest that there is no direct gain of heCGA over eCMA for this problem. However, there is another observation that can be made. From a practitioner point of view, heCGA is a more flexible search algorithm since it gets the optimal solution within a bigger range of population size values. In FIG. 5, the number of function evaluations is shown for heCGA to get the target solution (for k=4 and m=10) as the population size increases. Only population sizes that solve m−1 BBs on average (over 30 runs) are shown in the plot. The plotted points form four increasing lines. In each line, as the population increases, the number of function evaluations also increases until it falls down into a lower line and then keeps increasing again. This behavior repeats itself until the population size is enough to discover all (m−1 partitions due to the stopping criteria used) correct BB partitions in the first generation, being the problem solved by the enumerative BB local search procedure of heCGA in the initial generation. Each discontinuity between lines represents a decrease in the number of generations necessary for heCGA to solve the problem successfully. This happens because, as the population size is increased, the model building procedure can capture more and more correct BB partitions, improving the ability of BB local search to solve the problem quickly.

Deception Plus Scaling

In this problem, the inter-BB difficulty is explored together with the intra-BB difficulty. Here, we use the boundedly deceptive function used above, but now each subfunction fitness contribution to the overall fitness is exponentially scaled. The weight of each BB fitness contribution is given by powers of 2, being our exponentially scaled deceptive function defined as $$f_{ds}(X) = \sum_{i=0}^{m-1} 2^i f_{trap}(x_{ki}, x_{ki+1}, \ldots x_{ki+k-1})$$

This function has the interesting property that a high scaled subfunction gives more fitness contribution than the sum of all subfunctions below it. When solving this problem with a GA in the initial generations, the signal that comes from the low-salient BBs is negligible when faced with the decision making that is being done between the high-salient BBs. Whenever the higher BBs are solved, the next higher scaled BBs will have their time of attention by the GA, and so on. Given this property, the correct BB partitions can only be discovered in a sequential way, which contrasts with the uniformly scaled case where the problem structure can be captured in the first generation with a sufficiently large population size. Therefore, eCMA is not able to solve exponentially scaled problems with reasonable population sizes, as has been recognized before. The model built based on the selected initial random individuals will only be able to get the high-salient BB partitions, failing the rest. Thus, the model of eCMA has to be updated at a regular schedule to be able to capture the BBs structure in a sequential manner.

Figure 6:
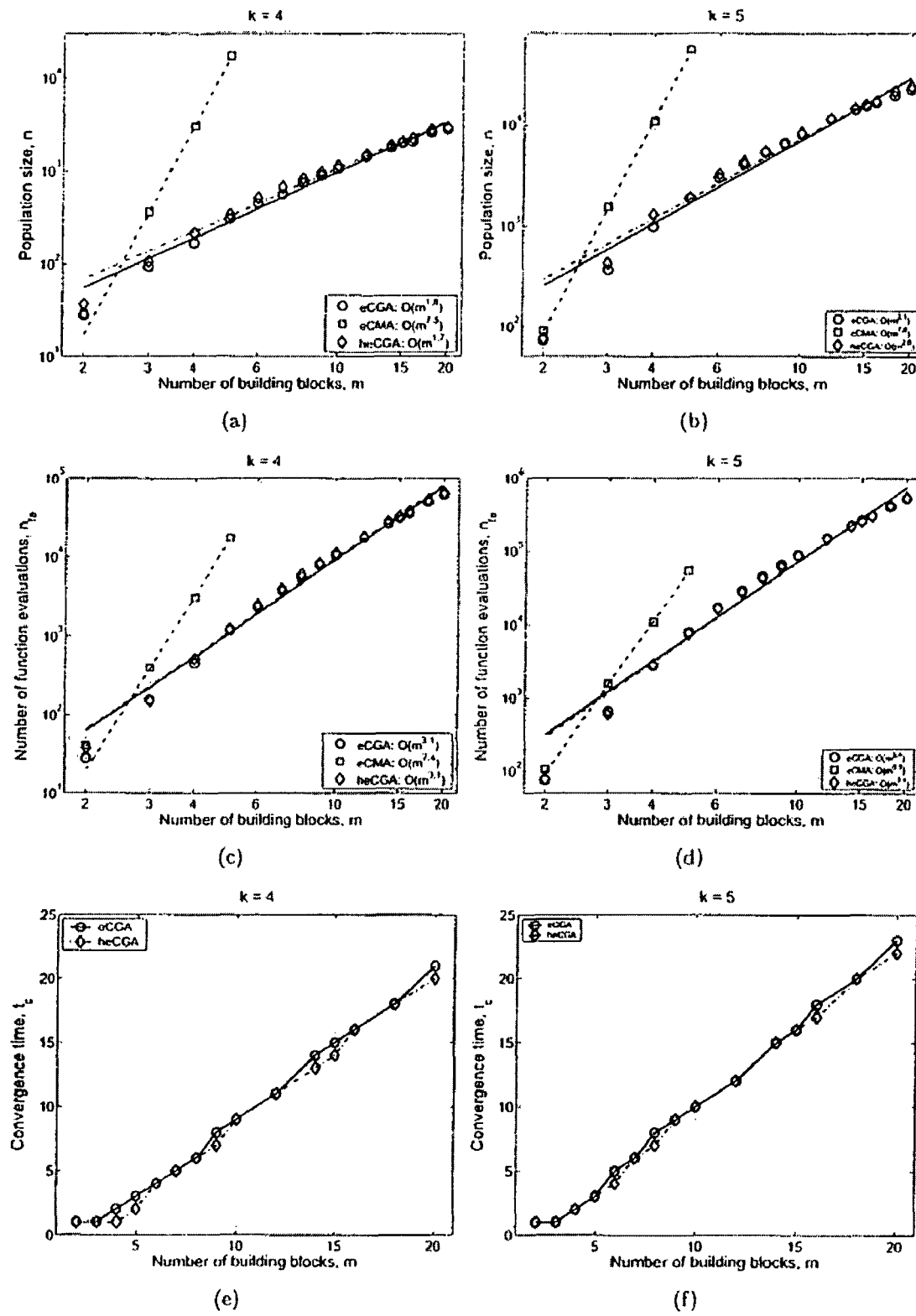
FIG. 6 shows population sizes, number of function evaluations, and convergence times for an exemplary heCGA operation for a function combining deception and scaling, compared to operation of eCGA and eCMA.

On the other hand, FIG. 6 empirically shows that eCMA needs exponential population sizes to achieve the target solution. In heCGA, the model is updated every generation, and the BB-wise mutation can benefit from that. Nevertheless, heCGA spends approximately the same number of function evaluations to solve the problem as the regular eCGA. In the exponentially-scaled problem case, heCGA behaves similarly to eCGA, preferring a reasonable population size, enough to get the most relevant BBs and then keep going sequentially to the remaining ones. In terms of number of generations, heCGA scales as does the eCGA, although for some m heCGA takes one less generation, which is not significant in terms of function evaluations.

Figure 7:
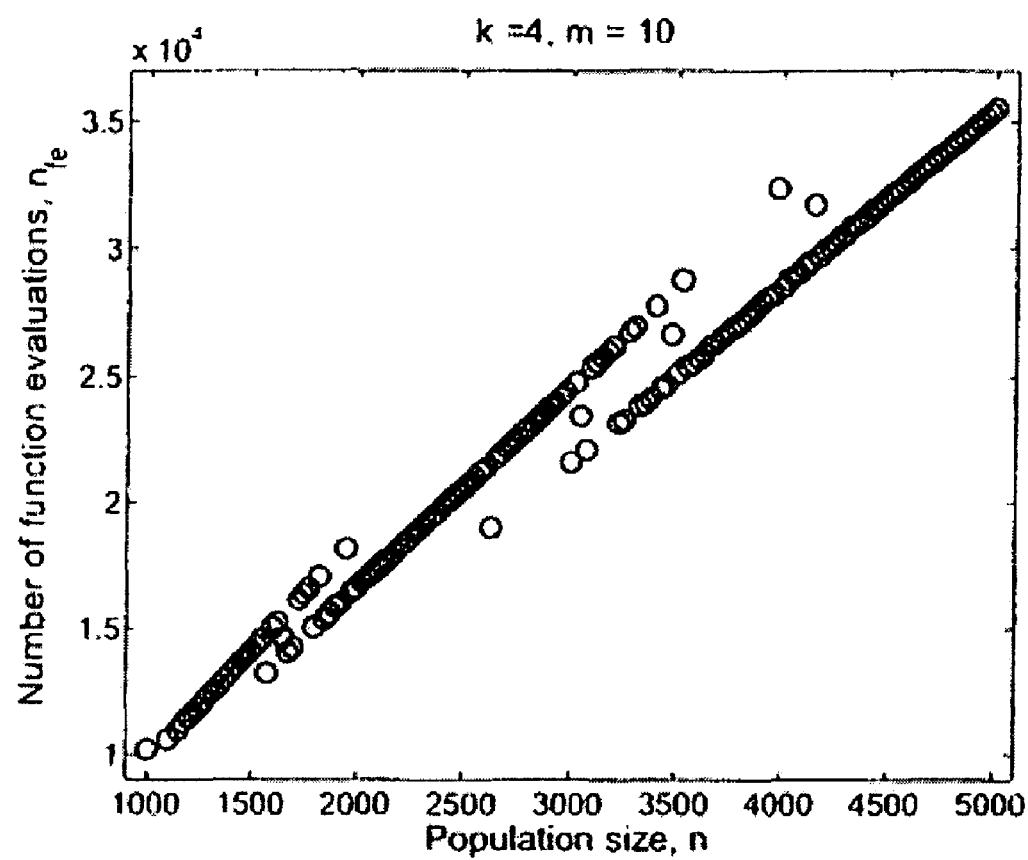
FIG. 7 shows the number of function evaluations to get a target solution for heCGA, where k=4 and m=10 for the deceptive and scaling function.

FIG. 7 shows the number of function evaluations that heCGA needs to solve this problem as the population size increases. Here, we can see that the number of function evaluations grows almost linearly with the population size. Since increasing the population size will not reveal much more correct BB partitions, the effect on the overall search process is minor.

Looking at the behavior of heCGA on both uniformly and exponentially scaled problems, we can observe distinct dynamics for each problem. In the uniformly scaled case, heCGA has a similar behavior to eCMA, which is the algorithm that performs better. For the exponentially scaled problem, heCGA completely changes its dynamics to behave like eCGA, that is known to perform much better than eCMA. Also in this case, no direct gain is achieved by heCGA over the best algorithm. Nevertheless, we can observe what seems to be the greatest advantage of this new approach: robustness. For both problems, heCGA obtains the same performance as the one obtained by the best algorithm for each domain. To get a better insight on these observation, we perform additional experiments with a problem with additive exogenous noise, which is considered to be the core of the extra-BB difficulty dimension.

Deception Plus Noise

Noise is a common factor in many real-world optimization problems. Sources of noise can include physical measurement limitations, incomplete sampling of large spaces, stochastic simulation models, human-computer interaction, among others. Furthermore, evaluation-relaxation techniques are commonly used in genetic and evolutionary algorithms for performance enhancement, bringing an additional source of noise to the original optimization problem. Thus, analyzing the heCGA performance in noisy environments is important to strengthen the robustness claims verified for the first two problems.

For our experiments, we assume that the exogenous noise follows a Gaussian distribution with mean 0 and variance $\sigma_N^2$. To make the problem even more challenging, we try to optimize a noisy version of the uniformly scaled boundedly deceptive function used before. This function is defined as follows:

$$f_{dn}(X) = f_d(X) + G(0, \sigma_N^2)$$

To overcome the noise with eCMA, each function evaluation in the BB local search phase needs to be averaged over a sample of function evaluations. The number of times that each individual needs to be evaluated to allow correct decision making between competing BBs depends on the noise variance. Therefore, to obtain the optimal results for eCMA in noisy conditions, we need to run 2 bisections methods, one over the initial population size and the other one over the number of fitness samples that is necessary to correctly evaluate an individual. First, we run a bisection method to get the minimal population size that generates a model with at least m−1 correct BB partitions. Then, for each population that captures the target dependencies, a second bisection method is performed over the number of fitness samples to obtain the minimal number of times that an individual needs to be evaluated, to achieve a final solution with the BBs detected by the model optimally solved.

Figure 8:
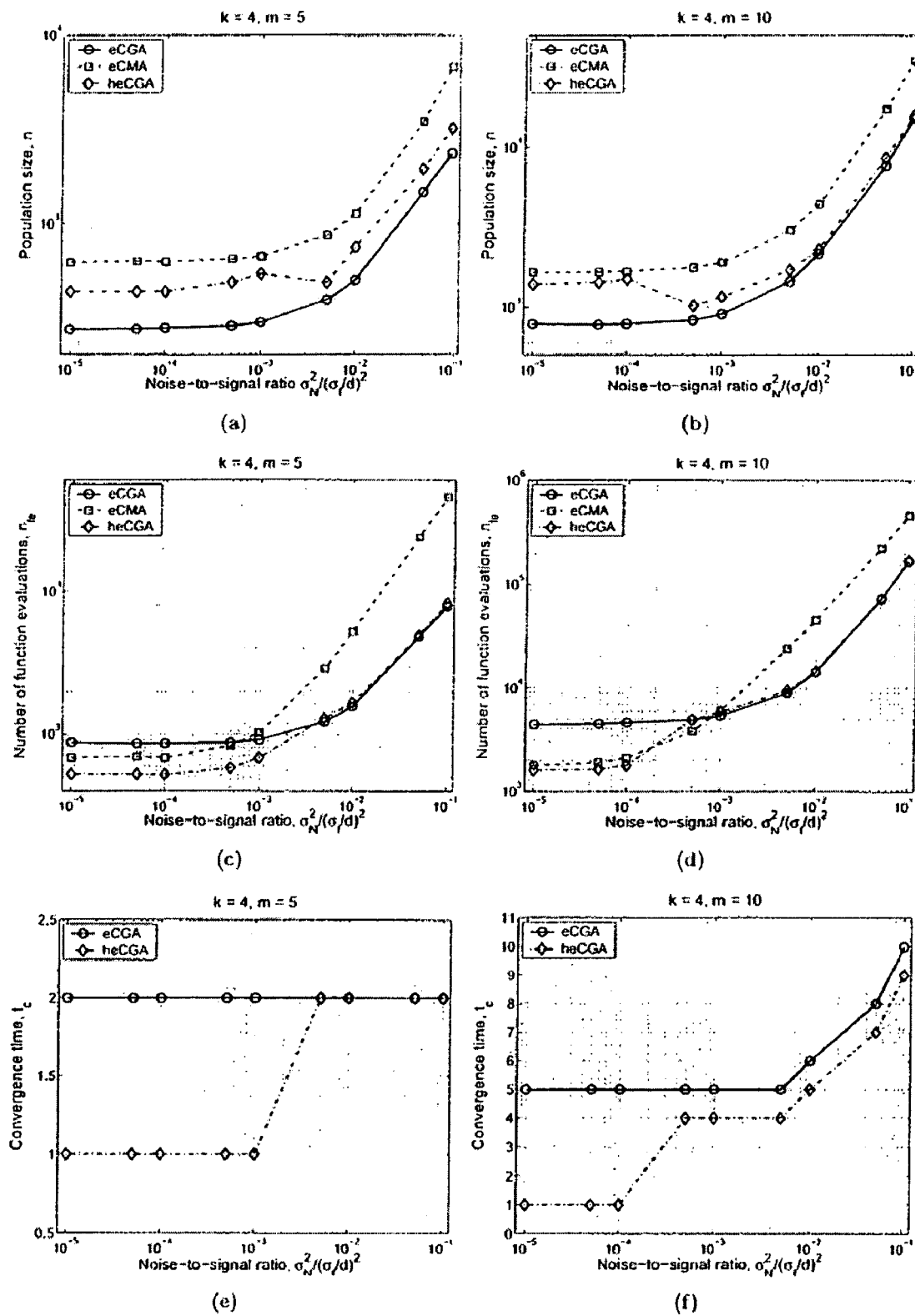
FIG. 8 shows population sizes, number of function evaluations, and convergence times for an exemplary heCGA operation for a function combining deception and noise, compared to operation of eCGA and eCMA.

FIG. 8 depicts the results obtained for a uniformly scaled boundedly deceptive function with additive noise for k=4 and m={5, 10}. As the noise-to-signal ratio $\sigma_N^2/(\sigma_f/d)^2$ increases, two different scenarios can be identified. For small values of noise, as $\sigma_N^2/(\sigma_f/d)^2 \to 0$, the picture painted here is somewhat similar to the deterministic case, where eCMA and heCGA perform better than eCGA. However, in this case eCMA performs slightly worse than heCGA. This is given to the fact that in here we force the MPM to detect at least m−1 partitions, when in the deterministic case we just care if eCMA obtains a final solution with m−1 BBs correct.

When the noise increases the behavior of the algorithms changes. Considering the tested cases, k=4 and m={5, 10}, the scenario changes around $\sigma_n^2/(\sigma_f/d)^2=0.001$. At this point, eCGA starts to perform better than eCMA, which is expected given that crossover is likely to be more useful than mutation in noisy environments. However, heCGA, which was behaving like eCMA (using bigger population sizes to solve the problem in the first generation) to small noise values, starts performing similarly to eCGA, that is known to be a better approach than eCMA to moderate-to-high noise values. This change in heCGA behavior can be better observed in the population size and number of generations plots.

Figure 9:
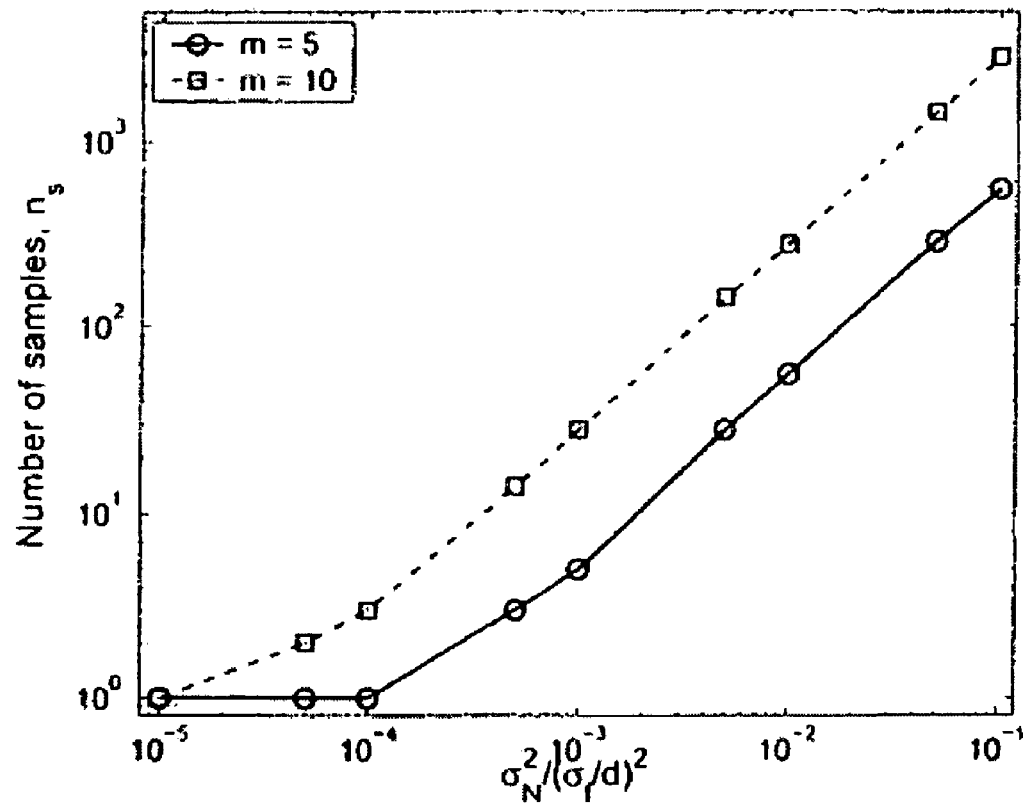
FIG. 9 shows the number of function evaluations to get a target solution for heCGA, where k=4 and m=10 for the function combining deception and noise.

In FIG. 9, it is shown the minimal number of fitness samples necessary to let eCMA correctly decide between competing BBs in noisy conditions. Note that in heCGA the BB local search phase does not use the averaging technique used in eCMA, since we want to test heCGA in various difficulty dimensions as a black-box method. Based on these results, the robust behavior of heCGA still stands for noisy conditions, confirming the observations made above.

Given the heCGA, PMBHGA, or other hybrid methods, the time continuation technique can be incorporated into the overall model in FIG. 1. For example, the evaluation step in heCGA (step 204) may be incorporated into step 103 of FIG. 1, and may be affected by the results of a surrogate fitness model, as constructed in step 112. Generation of a new population in heCGA (step 216) may be affected by analyzing a structural model and a surrogate fitness model. Exemplary changes may include emphasizing, de-emphasizing, or even removing one or more operators, such as the mutation operators and/or the population sampling operators. Alternatively or additionally, the amount of mutation vs. probabilistic sampling may be affected by determining a population size n for a new population. As shown in FIGS. 4-9, changing the population can cause the proportion of probabilistic sampling (e.g., crossover) to mutation to change. This latter method allows the heCGA to be used as a "black box", without alteration. Thus, heCGA, PMBHGA or other hybrid methods may be adapted either by emphasizing or de-emphasizing operators, and/or by changing parameters from outside the method.

As another example, Bayesian networks are powerful graphical models that combine probability theory with graph theory to encode probabilistic relationships between variables of interest. The Bayesian Optimization Algorithm (BOA) uses Bayesian networks as the structural model to capture the (in)dependencies between the variables of the problem. BOA typically starts with an initial solution set or population (e.g., randomly generated) that is evaluated and submitted to a selection operator that gives preference to high-quality solutions. The set of selected individuals is then used as the training dataset to learn the probabilistic (structural) model for the present generation. After obtaining the model structure and parameters, the offspring solution set or population is generated by sampling from the distribution of modeled individuals. The new solutions are then evaluated and incorporated into the original population. As a nonlimiting example, a replacement scheme may be used, where new solutions fully replace the original population.

A Bayesian network is defined by a structure and corresponding parameters. The structure is represented by a directed acyclic graph, where the nodes correspond to the variables of the data to be modeled and the edges correspond to conditional dependencies. The parameters are represented by the conditional probabilities for each variable given any instance of the variables that this variable depends on. More formally, a Bayesian network encodes the following joint probability distribution:

$$p(X) = \prod_{i=1}^{\ell} p(X_i | \Pi_i)$$

Where $X=(X_1, X_2, \ldots, X_l)$ is a vector of all the variables of the problem, $\Pi_i$ is the set of parents of $X_i$ (nodes from which there exists an edge to $X_i$), and $p(X_i|\Pi_i)$ is the conditional probability of $X_i$ given its parents $\Pi_i$.

In an exemplary BOA structural modeling process, both the structure and the parameters of the probabilistic model are searched and optimized to best fit the data (set of promising solutions). To learn the most adequate structure for the Bayesian network, a greedy algorithm preferably is used for a good compromise between search efficiency and model quality. The quality of a given network structure is quantified by using popular scoring metrics for Bayesian networks such as the Bayesian optimization criteria (BIC) or the Bayesian Dirichlet metric with likelihood equivalence (BDe).

The parameters of a Bayesian network are represented by a set of conditional probability tables (CPTs) specifying the conditional probabilities for each variable given all possible instances of the parent variables. Alternatively, these conditional probabilities can be stored in the form of local structures such as decision trees or decision graphs, allowing a more efficient and flexible representation of local conditional distributions.

A surrogate fitness model may be used to estimate the fitness of a proportion of the population, thereby reducing the number of function evaluations. In an exemplary method to model fitness in BOA, for every variable $X_i$, and each possible value $x_i$ of $X_i$, an estimate of the marginal fitness contribution of a subsolution with $X_i=x_i$ is stored for each instance $\pi_i$ of $X_i$'s parents $\Pi_i$. Therefore, in the binary case, for example, each row in the CPT is extended by two additional entries. The fitness of an individual can be estimated as $$f_{est}(X_1, X_2, \ldots, X_\ell) = \bar{f} + \sum_{i=1}^{\ell} (\bar{f}(X_i | \Pi_i) - \bar{f}(\Pi_i)),$$

where $\bar{f}$ is the average fitness of all solutions used to learn the surrogate, $\bar{f}(X_i|\Pi_i)$ denotes the average fitness of solutions with $X_i$ and $\Pi_i$, and $\bar{f}(\Pi_i)$ is the average fitness of all solutions with $\Pi_i$.

Figure 10:
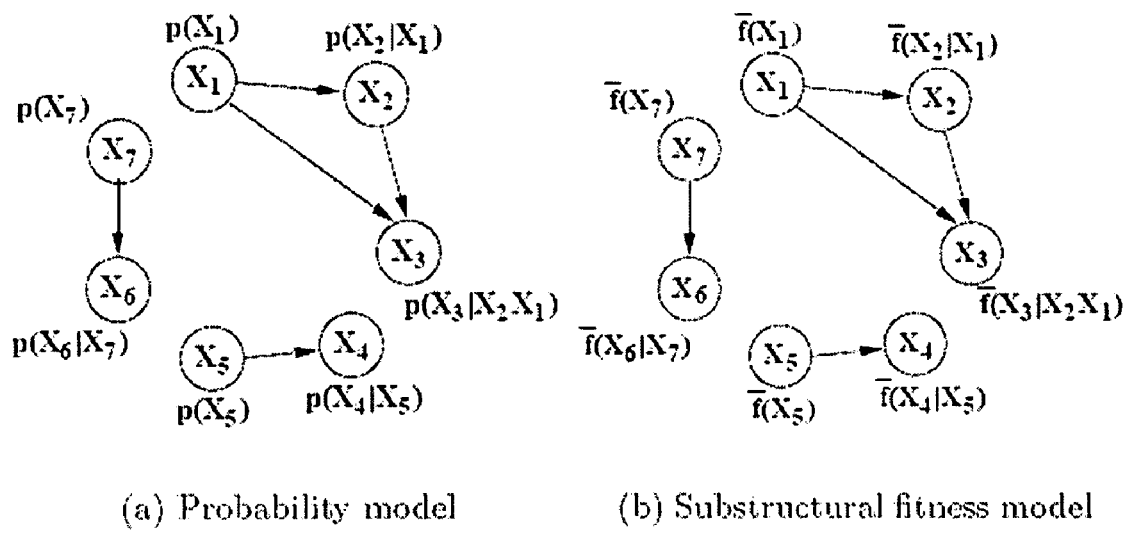
FIG. 10 shows an exemplary probability model and an exemplary substructural fitness model for a Bayesian Optimization Algorithm (BOA), according to embodiments of the present invention.

FIG. 10 shows an example of a BOA probability model and the substructural fitness model in BOA. For the substructural fitness model shown in FIG. 10, an exemplary estimated fitness may be given by $$f_{est}(X_1, X_2, \ldots, X_7) = \bar{f} + \bar{f}(X_1) + \bar{f}(X_2|X_1) + \bar{f}(X_3|X_2X_1) + \bar{f}(X_5) + \bar{f}(X_4|X_5) + \bar{f}(X_7) + \bar{f}(X_6|X_7)$$

Fitness information may also be incorporated in Bayesian networks with decision trees or graphs in a similar way. In this case, the average fitness of each instance for every variable should be stored in every leaf of the decision tree or graph. The fitness averages in each leaf are now restricted to solutions that satisfy the condition specified by the path from the root of the tree to the leaf. An example of this methodology is described in Pelikan, M., & Sastry, K., "Fitness inheritance in the Bayesian optimization algorthrim", In Deb, K. e.a. (Ed.), Proceedings of the Genetic and Evolutionary Computation Conference (GECCO-2004), Part II, LNCS 3103 (pp. 48-59), 2004.

Given the exemplary structural model and/or surrogate fitness model for BOA, a search strategy can be developed for searching within substructural neighborhoods. One significant requirement for designing an efficient mutation operator is to ensure that it searches in the correct neighborhood. This is often accomplished by exploiting and incorporating domain- or problem-specific knowledge in the design of neighborhood operators. While these neighborhood operators are designed for a particular search problem, oftentimes on an ad-hoc basis, they do not generalize their efficiency beyond a small number of applications. On the other hand, simple bitwise hillclimbers are frequently used as local search methods with more general applicability, providing inferior but still competitive results, especially when combined with population-based search procedures. There is a tradeoff between generalization and efficiency for neighborhood operators with fixed structure. Therefore, benefits are available by providing systematic methods for designing neighborhood operators that can solve a broad class of search problems.

The exploration of neighborhoods defined by the probabilistic models of EDAs is an approach that exploits the underlying problem structure while not losing the generality of application. The resulting exemplary mutation operators explore a more global, problem-dependent neighborhood than traditional local, purely representation-dependent search procedures.

Given the structure of the Bayesian network, several neighborhood topologies can be considered to perform random or improvement-guided mutations. For a given variable $X_i$, the corresponding set of parent nodes $\Pi_i$, and set of child nodes $\Omega_i$ (nodes to where an edge arrives from node $X_i$), we define three different substructural neighborhoods:

1) A parental neighborhood considers variable $X_i$ together with the parent variables $\Pi_i$. This neighborhood is therefore defined by $K=1+|\Pi_i|$ different variables, resulting in $2^K$ possible values in the binary realm.

2) A children neighborhood considers variable $X_i$ together with the child variables $\Omega_i$. This neighborhood is therefore defined by $K=1+|\Omega_i|$ variables.

3) A parental+children neighborhood considers variable $X_i$ together with both parent variables $\Pi_i$ and child variables $\Omega_i$. This neighborhood is therefore defined by $K=1+|\Pi_i|+|\Omega_i|$ variables.

Figure 11:
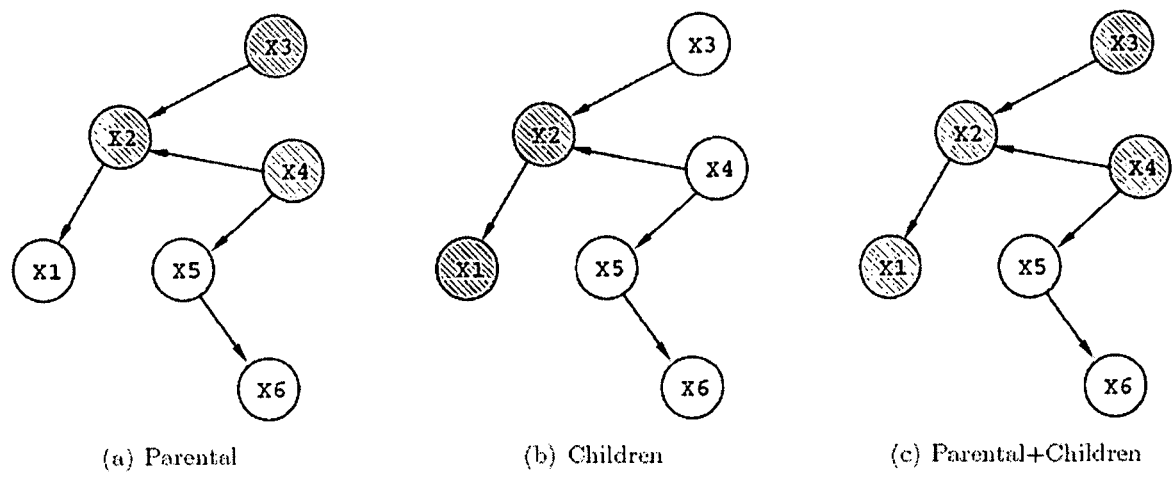
FIG. 11 shows exemplary parental, children, and parental+ children neighborhoods for substructural search.

These three neighborhoods explore the structure captured by the Bayesian network to different extents. FIG. 11 shows an exemplary topology of the different substructural neighborhoods.

Using, as a nonlimiting example, the parental neighborhood defined above, an exemplary substructural hillclimber to perform hillclimbing in the substructural space of an individual will now be described. This hillclimbing is performed for a proportion of the population in BOA to speed up convergence to good solutions, as in hybrid GAs. After the offspring population is sampled from the probabilistic model and evaluated, each individual is submitted to substructural hillclimbing with probability $p_{ls}$. The exemplary substructural hillclimber can be described as follows:

1) Consider the first variable $X_i$ according to the ancestral reverse ordering of variables in the Bayesian network.

2) Choose the values $(x_i, \pi_i)$ associated with the maximal substructural fitness $\bar{f}(X_i|\Pi_i)$.

3) Set variables $(X_i,\Pi_i)$ of the considered individual to values $(x_i,\pi_i)$ if the overall fitness of the individual is improved by doing so, otherwise leave the individual unchanged.

4) Repeat steps 2-3 for all remaining variables following the ancestral reverse order of variables.

An exemplary run of this hillclimbing method is described in Lima, C. F., Pelikan, M., Sastry, K., Butz, M., Goldberg, D., and Lobo, F. G., "Substructural Neighborhoods for Local Search in the Bayesian Optimization Algorithm", Parallel Problem Solving from Nature (PPSN IX), 2006, 232-241, which is incorporated herein by reference. In this exemplary substructural hillclimber, we use the reverse order of that used to sample the variables of new solutions, where each node is optimized by its parents. By doing so, higher-order dependencies within the same linkage group are optimized first. This procedure aims to reduce the possibility of doing incorrect decisions when considering problems whose lower-order statistics lead the search away from global optima.

Additional, nonlimiting examples of substructual hillclimbers may be provided by, for example, changing step 3) above. One additional method uses the estimated fitness of the individual to decide if the best substructure (according to $\bar{f}(X_i|\Pi_i)$) for a given neighborhood should be accepted. Another additional method uses the actual fitness function to make the decision. For example, after performing substructural hillclimbing for all variables, the resulting individual is evaluated with the fitness function before it is inserted back into the population. This avoids the propagation of error possibly introduced by using surrogate fitness. Thus, the surrogate in an exemplary method may be used only to perform local search in substructural neighborhoods.

Searching within the same substructural neighborhoods for different individuals yields results whose similarity increase with the accuracy of the linkage model. However, in practice, performing local search on different individuals helps to overcome incorrect biases from the errors in the substructural models.

Other configurations are possible. Aspects of exemplary embodiments enable optimization methods, such as but not limited to competent genetic and evolutionary algorithms, to solve extraordinarily difficult problems in the most various disciplines without requiring of the user significant knowledge about the solver mechanics, which is not the case for standard genetic algorithms. Extensions beyond domains of discrete, fixed-length representations to real vectors, strings of arbitrary length, or program codes, are straightforward, and therefore preferred embodiments offer a very general method for efficiency enhancement of powerful search algorithms. Furthermore, it is possible to incorporate such time continuation in many different competent genetic algorithms such as the Bayesian optimization algorithm above, hierarchical Bayesian optimization algorithm (hBOA), dependency structure matrix driven genetic algorithm (DSMGA), etc. Embodiments of the present invention may also be very valuable as an add-on to other systems and methods. Designing an optimal hybrid scheme can depend strongly on problem nature. Global-local search hybrid theory (Goldberg & Voessner, "Optimizing global-local search hybrids", *Proceedings of the Genetic and Evolutionary Computation Conference*, 220-228, 1999) may be useful in such designs.

Additionally, certain experiments described herein consider non-overlapping BBs. However, many problems can have different BBs that share common components. The effect of overlapping interactions between variables has been shown to be similar to that of exogenous noise. Based on our results, for example, heCGA is likely to perform as with the eCGA, which performs better than eCMA for these kind of problems. However, when considering problems with overlapping BBs, a probabilistic model used by exemplary algorithms, such as MPM, can no longer capture overlapping dependencies. For that, as explained above, more powerful PMBGAs such as BOA should be used with a BB-wise mutation operator in BOA's main loop.

An important class of nearly decomposable problems is hierarchical problems, in which the BB interactions are present at more than a single level. Presently, the hierarchical BOA (hBOA) can solve hierarchical problems in tractable time. Thus, it is also contemplated that a BB-wise mutation operator may be useful for these kinds of problems.

Adaptive methods for genetic and evolutionary computing have been shown and described herein. An exemplary algorithm according to embodiments of the present invention using adaptive time continuation combines the BB-wise crossover operator from eCGA with a BB-wise mutation operator that is also based on the probabilistic model of eCGA. It has been shown experimentally that, independently from the faced difficulty dimension(s), such an algorithm can obtain improved performance, imitating the behavior of the best approach (crossover-based or mutation-based) for each problem.

The results shown and described above indicate the robustness of using both search operators—crossover and mutation—in the context of adaptive genetic and evolutionary computing, such as PMBGAs, as it is known to be advantageous for traditional GAs. Given the observed robustness of heCGA, for example, such adaptive genetic and evolutionary computing should be suitable in various types of problems for applying in a "black-box system" basis.

It will be appreciated that methods and systems of the present invention are applicable to optimization methods in addition to those described above with respect to genetic and evolutionary computing. Examples of optimization methods that may be improved using methods and systems of the present invention include, but are not limited to, evolutionary computing, operations research (OR), global optimization methods, meta-heuristics, artificial intelligence and machine learning techniques, statistical techniques, data mining, etc. The present invention is not intended to be limited to genetic and evolutionary computing.

Those knowledgeable in the art will also appreciate that the present invention is well suited for practice in the form of a computer program product, and accordingly that the present invention may comprise computer program product embodiments. Indeed, it will be appreciated that the relatively intense calculational nature and manipulation of data that steps of invention embodiments comprise suggest that practice in the form of a computer program product will be advantageous. These program product embodiments may comprise computer executable instructions embedded in a computer readable medium that when executed by a computer cause the computer to carry out various steps. The executable instructions may comprise computer program language instructions that have been compiled into a machine-readable format. The computer readable medium may comprise, by way of example, a magnetic, optical, or circuitry medium useful for storing data. Also, it will be appreciated that the term "computer" as used herein is intended to broadly refer to any machine capable of reading and executing recorded instructions.

The steps performed by the computer upon execution of the instructions may generally be considered to be steps of method embodiments of the invention. That is, as discussed herein it will be understood that method embodiment steps may likewise comprise program product steps.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended clams.

Various features of the invention are set forth in the appended claims.

What is claimed is:

1. A method for optimizing a solution set in one or more computers, the solution set comprising members representing individual solutions to a problem, the method comprising, not necessarily in the sequence listed:

generating a solution set;

evaluating solutions in said solution set in the one or more computers;

selecting desirable solutions from the solution set and saving said selected desirable solutions in the one or more computers;

creating a structural model in the one or more computers using said desirable solutions;

creating a surrogate fitness model in the one or more computers based on said structural model and said desirable solutions;

generating a new solution set;

wherein said generating a new solution set comprises:
analyzing at least one of said structural model and said surrogate fitness model;
determining a method for generating a new solution set based at least in part on said analyzing;
generating a new solution set based on said determined method.

2. The method of claim 1, wherein said analyzing comprises analyzing said surrogate fitness model, and said determining a method comprises determining a proportion of model sampling versus mutation.

3. The method of claim 2, wherein said analyzing said surrogate fitness model comprises inferring at least one of scaling between variables, scaling between linked groups of variables, and a signal-to-noise ratio of said surrogate fitness model.

4. The method of claim 3, wherein said analyzing said surrogate fitness model further comprises comparing said surrogate fitness model to a surrogate fitness model in a previous generation.

5. The method of claim 2, wherein said determining a proportion of model sampling versus mutation comprises at least one of emphasizing, de-emphasizing, and removing one or more sampling and mutation operators in said generating a new solution set.

6. The method of claim 1, wherein said analyzing comprises inferring at least one neighborhood for a local search using said structural model, and said determining comprises determining a local search within said inferred neighborhoods.

7. The method of claim 1, wherein said analyzing comprises analyzing said surrogate fitness model, and wherein said determining comprises determining a proportion of global and local search.

8. The method of claim 1, wherein said analyzing comprises analyzing said surrogate fitness model, and wherein said determining comprises selecting a local search method among a plurality of available local search methods.

9. The method of claim 1, further comprising:
determining if completion criteria is satisfied;
if completion criteria is not satisfied, evaluating at least a portion of solutions in said new solution set using said surrogate fitness model.

10. The method of claim 9, wherein said analyzing comprises analyzing said surrogate fitness model, and further comprising: determining the portion of the solutions in said new solution set to be evaluated using said surrogate fitness model based on said analyzing said surrogate fitness model; evaluating said determined portion of the solutions in said new solution set using said surrogate fitness model; evaluating other of the solutions in said new solution set using a fitness calculation other than said surrogate fitness model.

11. A computer program product useful to optimize a solution set, the computer program product comprising computer readable instructions stored on a non-transitory computer readable medium that when executed by one or more computers cause one or more computers to perform the steps in the method of claim 1.

12. The method of claim 1, wherein said determining a method changes the method for generating a new solution set from a method used to generate a new solution set in a previous iteration.

13. A method for optimizing a solution set in one or more computers, the solution set comprising members representing individual solutions to a problem, the method comprising, not necessarily in the sequence listed:
generating a solution set;
evaluating solutions in said solution set in the one or more computers;
selecting desirable solutions from the solution set and saving said selected desirable solutions in the one or more computers;
creating a structural model in the one or more computers using said desirable solutions;
creating a surrogate fitness model in the one or more computers based on said structural model and said desirable solutions;
generating a new solution set at least partly based on said created structural model;
determining if completion criteria are satisfied;
if completion criteria are not satisfied, evaluating solutions in said new solution set in the one or more computers;
wherein said evaluating solutions in said new solution set comprises:
analyzing at least one of said structural model and said surrogate fitness model in the one or more computers;
determining a method for evaluating solutions based at least in part on said analyzing;
evaluating solutions in said new solution set in the one or more computers based on said determined method;
wherein said analyzing comprises analyzing said structural model to infer a topology of a parallel function evaluation, and wherein said determining a method comprises determining an evaluation method using said inferred topology.

14. A computer program product useful to optimize a solution set, the computer program product comprising computer readable instructions stored on a non-transitory computer readable medium that when executed by one or more computers cause one or more computers to perform the steps in the method of claim 13.

15. A method for optimizing a solution set in one or more computers, the solution set comprising members representing individual solutions to a problem, the method comprising, not necessarily in the sequence listed:
generating a solution set;
evaluating solutions in said solution set in the one or more computers;
selecting desirable solutions from the solution set and saving said desirable solutions in the one or more computers;
creating a structural model in the one or more computers using said desirable solutions;
creating a surrogate fitness model in the one or more computers based on said structural model and said desirable solutions;
analyzing at least one of said structural model and said surrogate fitness model in the one or more computers;
generating a new solution set in the one or more computers;
determining if completion criteria are satisfied;
if completion criteria are not satisfied, evaluating solutions in said new solution set;
wherein said generating a new solution set comprises:
determining a method for generating a new solution set based at least in part on said analyzing;
generating a new solution set based on said determined method;
wherein said evaluating solutions in said new solution set comprises:

determining a method for evaluating solutions based at least in part of said analyzing;
evaluating solutions in said new solution set based on said determined method.

16. The method of claim 15, wherein the structural model comprises at least one of a Bayesian optimization, an extended compact genetic algorithm, a decision tree, a probability table, and a marginal product model.

17. The method of claim 15, wherein said creating a surrogate fitness model comprises: inferring a form of said surrogate fitness model from said structural model to provide a structure; calibrating said structure using results from said evaluating solutions.

18. A computer program product useful to optimize a solution set, the computer program product comprising computer readable instructions stored on a non-transitory computer readable medium that when executed by one or more computers cause one or more computers to perform the steps in the method of claim 15.

19. A method for optimizing a solution set in one or more computers, the solution set comprising members representing individual solutions to a problem, the method comprising, not necessarily in the sequence listed:
   a) generating an initial solution set;
   b) evaluating solutions in said generated solution set in the one or more computers;
   c) selecting desirable solutions from said generated solution set and saving said selected desirable solutions in the one or more computers;
   d) creating a model in the one or more computers of said selected desirable solutions;
   e) mutating a best individual in said generated solution set;
   f) updating said created model using said mutated best individual;
   g) generating a new solution set in the one or more computers using said updated model;
   h) determining if stopping criteria is satisfied;
   i) if stopping criteria is not satisfied, repeating steps b)-g), wherein said generated new solution set replaces said generated new solution set in step b).

20. The method of claim 19, wherein said updating said created model comprises updating, by building block, said created model based on said mutated best individual.

21. The method of claim 19, wherein said created model comprises a marginal product model (MPM) and wherein said updating said created model comprises updating instance frequencies of the MPM according to building block instances present on said mutated best individual.

22. A computer program product useful to optimize a solution set, the computer program product comprising computer readable instructions stored on a non-transitory computer readable medium that when executed by one or more computers cause one or more computers to perform the steps in the method of claim 19.

23. A method for optimizing a solution set in one or more computers, the solution set comprising members representing individual solutions to a problem, the method comprising, not necessarily in the sequence listed:
   a) generating an initial solution set;
   b) evaluating solutions in said generated solution set in the one or more computers;
   c) selecting desirable solutions from said generated solution set and saving said selected desirable solutions in the one or more computers;
   d) creating a model in the one or more computers of said selected desirable solutions;
   e) mutating a best individual in said generated solution set;
   f) updating said created model using said mutated best individual;
   g) generating a new solution set in the one or more computers using said updated model;
   h) determining if stopping criteria is satisfied;
   i) if stopping criteria is not satisfied, repeating steps b)-g), wherein said generated new solution set replaces said generated new solution set in step b);
   wherein said created model comprises a marginal product model (MPM) and wherein said updating said created model comprises updating instance frequencies of the MPM according to building block instances present on said mutated best individual;
   wherein said updating instance frequencies of the MPM comprises:
   increasing BB instances frequencies of the mutated individual by s;
   decreasing the BB instances frequencies of a previous best individual by s;
   wherein said evaluating solutions uses an s-wise selection.

* * * * *

UNITED STATES PATENT AND TRADEMARK OFFICE
CERTIFICATE OF CORRECTION

PATENT NO.        : 8,131,656 B2
APPLICATION NO.   : 11/701066
DATED             : March 6, 2012
INVENTOR(S)       : Goldberg et al.

It is certified that error appears in the above-identified patent and that said Letters Patent is hereby corrected as shown below:

On the Title Page:

Item [56] Other Publications:

| | |
|---|---|
| Page 3, Column 2, line 28 | Before "2005" please delete "Comference" and insert --Conference-- therefor. |
| Page 3, Column 2, line 35 | Please insert a --"-- before "Enhanced". |
| Page 3, Column 2, line 37 | Please delete "making, (IliGAL" and insert --making." (IlliGAL-- therefor. |
| Page 3, Column 2, line 44 | Please insert a --"-- before "Efficient". |
| Page 3, Column 2, line 45 | Please insert a --"-- after "synthesis.". |
| Page 4, Column 1, line 45 | After "German" please delete the "." and insert a --:-- therefor. |
| Page 4, Column 1, line 45 | After "1998" please insert a --)--. |

In the Specification:

| | |
|---|---|
| Column 2, line 65 | Please delete "module" and insert --modules-- therefor. |
| Column 6, line 12 | Please delete "$\sqrt[3]{nT_f/T_c}$," and insert -- $\sqrt[3]{nT_f/T_c}$ -- therefor. |

Signed and Sealed this
Twenty-eighth Day of January, 2014

Michelle K. Lee
*Deputy Director of the United States Patent and Trademark Office*

CERTIFICATE OF CORRECTION (continued)
U.S. Pat. No. 8,131,656 B2

In the Specification:

| | |
|---|---|
| Column 9, line 17 | Please delete "patent application" and insert --Patent Application-- therefor. |
| Column 13, line 27 | Please delete "may used" and insert --may be used-- therefor. |
| Column 24, line 17 | Please delete "difficultly" and insert --difficulty-- therefor. |
| Column 26, line 58 | Please delete "observation" and insert --observations-- therefor. |
| Column 32, line 51 | Please delete "clams" and insert --claims-- therefor. |